United States Patent [19]

Frasier

[11] Patent Number: 4,597,066

[45] Date of Patent: Jun. 24, 1986

[54] METHOD OF SEISMIC PROCESSING AND DISPLAYING SIMULTANEOUSLY COLLECTED CONVENTIONAL AND CONVERTED P- OR S-WAVE DATA

[75] Inventor: Clint W. Frasier, Irvine, Calif.

[73] Assignee: Chevron Research Company, San Francisco, Calif.

[21] Appl. No.: 486,754

[22] Filed: Apr. 20, 1983

[51] Int. Cl.[4] ............................................. G01V 1/36
[52] U.S. Cl. ...................................... 367/38; 367/74; 367/50; 364/421
[58] Field of Search ...................... 367/38, 50, 51–54, 367/68, 74; 364/421

[56] References Cited

U.S. PATENT DOCUMENTS 4,373,197  2/1983  Gassaway et al. .................... 367/36

OTHER PUBLICATIONS

"Digital Processing of Transformed Reflected Waves", Nefedkina et al., Geologiyai Geofizika, vol. 21, #4, pp. 67–77, 1980.

"Velocity Spectra–Digital Computer...", Taner et al., Geophysics, vol. 34, #6, pp. 859–881, 12/69.

*Primary Examiner*—Nelson Moskowitz
*Assistant Examiner*—Ian J. Lobo
*Attorney, Agent, or Firm*—H. D. Messner; Edward J. Keeling

[57] ABSTRACT

This invention relates to a method of increasing resolution of high-intensity amplitude events in seismic records provided by common midpoint collection methods (CMP) wherein nonsymmetrical travel paths of incident and reflected rays of the generated conventional waves are taken into account prior to trace stacking due to the dip and depth of the target reflector. Then in accordance with the invention, the converted phases of the conventional seismic wave, are processed as to define a series of common reflection point (CRP) coordinates each associated with a gather of converted traces as if a source associated with a given corrected trace was placed at each CRP and activated followed immediately by the relocation of a detector at the CRP and the reception of converted phases of the generated wave comprising the trace where the equation of coordinate transformation is selected from the group comprising:

$CRP = kD + (1 - k)SP$: for conversions of P-waves to Sv-waves at the target;

$CRP = (1 - k)D + kSP$: for conversions of Sv-waves to P-waves at the target;

where $$k = \frac{(V_p/V_s)}{[(V_p/V_s) + \{1 + (X/h)\sin\alpha\}(1 + f)^{-\frac{1}{2}}]};$$

$$f = \frac{[(V_p/V_s) - 1]}{[(V_p/V_s) + 1]}(X/h)^2 \cos^2\alpha;$$

Vp and Vs are the P-wave and Sv-wave velocities, respectively, of the overburden;
X is the source-receiver offset distance;
h is the depth of the target reflector;
α is the dip angle of the target reflector; and
SP and D are source and detector coordinates, respectively, along the line of survey.

Further aspects of the invention relate to improving the diagnostic qualities of zero offset sections of conventional and converted traces (collected simultaneously via a series multicomponent detectors) by their display on a side-by-side basis.

15 Claims, 41 Drawing Figures

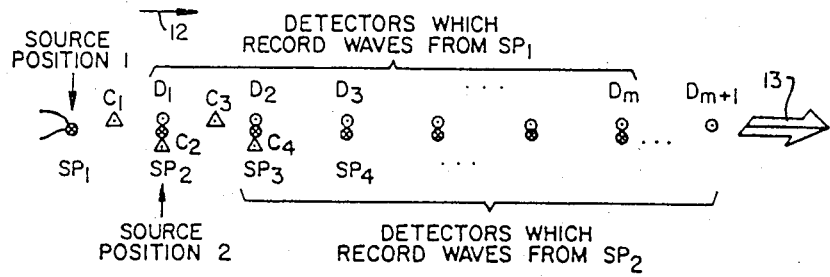
FIG. 1.
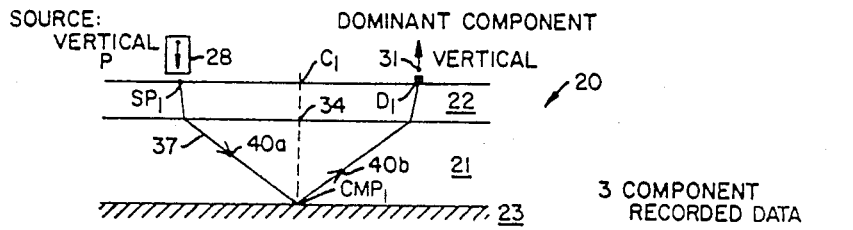
FIG. 2A.
FIG. 2D.
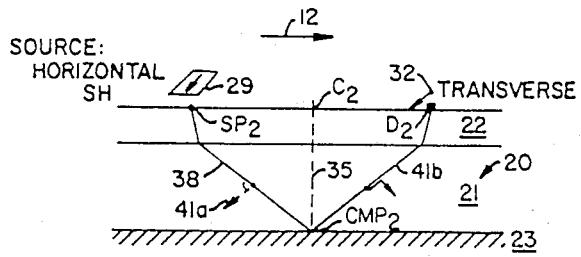
FIG. 2B.
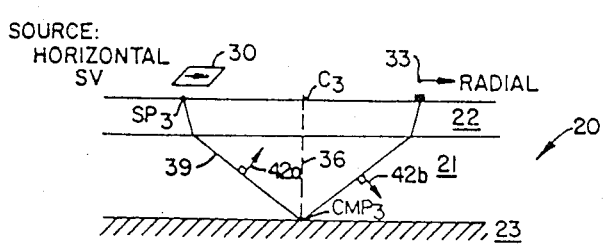
FIG. 2C.

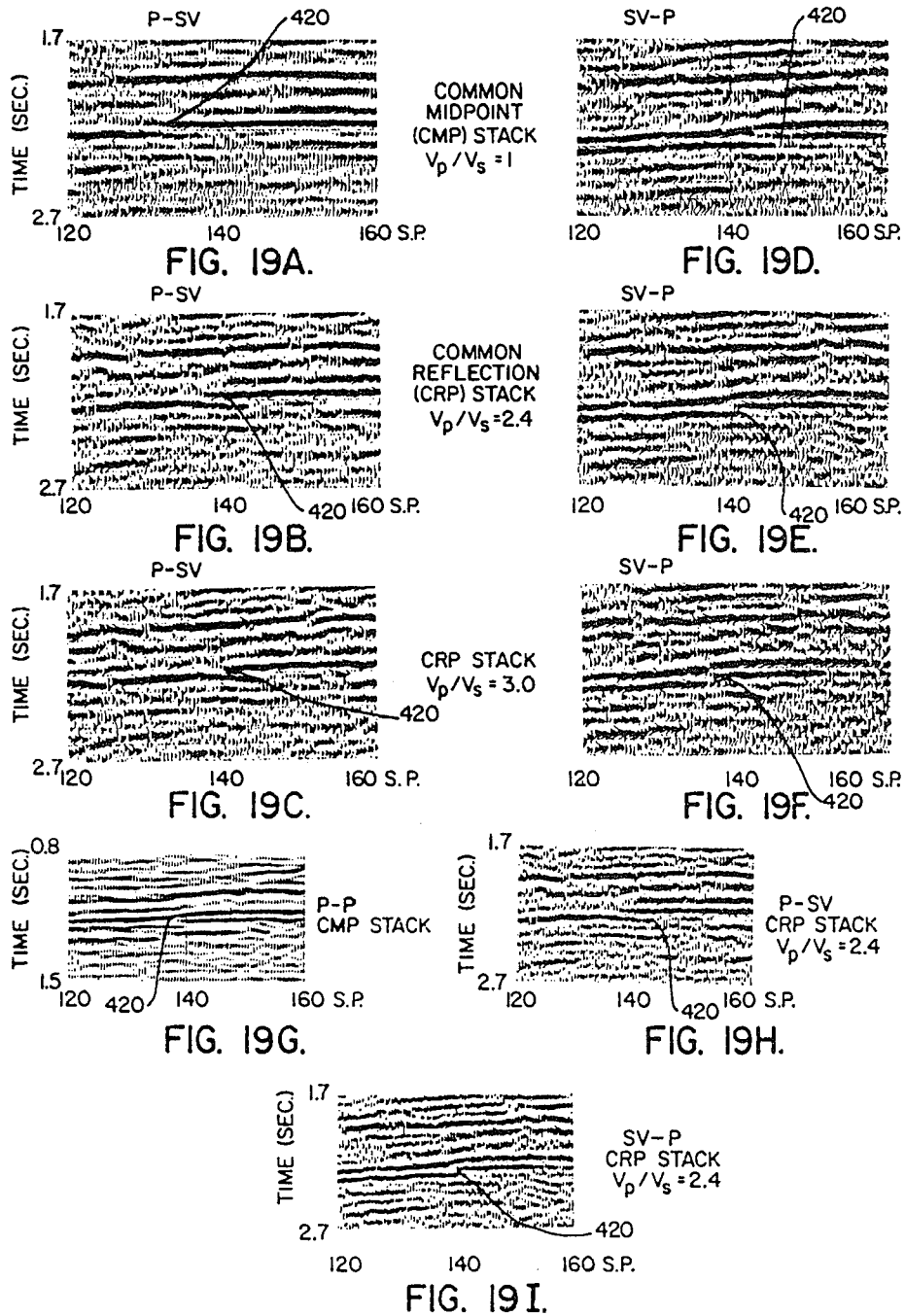

METHOD OF SEISMIC PROCESSING AND DISPLAYING SIMULTANEOUSLY COLLECTED CONVENTIONAL AND CONVERTED P- OR S-WAVE DATA

SCOPE OF THE INVENTION

The present invention relates to geophysical exploration and more particularly to processing and display of simultaneously collected conventional and converted seismic waves wherein non-symmetrical path lengths of the incident primary waves and the reflected converted waves are accounted for prior to trace stacking. As a result, previously obtained converted waves, are transformed to finite offset sections of true zero offset sections irrespective of reflector depth or dip. Their subsequent side-by-side display with zero offset sections of conventional data, improves resolution of high intensity amplitude events common to both sections to a surprising degree.

BACKGROUND OF THE INVENTION

Traditional collection and processing of seismic reflection data begins with the separate generation of conventional pressure waves (P-waves) or shear waves (S-waves) followed by their separate recording on single component receivers, i.e receivers that have active elements that respond to motions of the reflected waves in only one direction. Assuming a vertically oriented seismic source, conventional P-waves travel down into the earth and are reflected from one (or more) geologic layers as P-waves. A spread of receivers whose active elements respond to vertically oriented elastic wave motion only, record the P-waves. Similarly, for shear wave exploration, S-waves produced by a horizontally oriented seismic source, are reflected from similar reflectors as S-waves, and are recorded by the spread of receivers in similar fashion except that the active elements of the receivers would respond to horizontally oriented wave motion exclusively.

Processing of either P-wave and/or S-wave data is further complicated by the fact that collection is usually carried out using common midpoint (CMP) "roll-along" methods. Such methods utilize overlapping spreads of receivers in combination with "forward rolled" sources along a line of survey to generate substantial numbers of "redundant" seismic traces. That is, the latter are redundant in that a certain number of traces can be associated with the same common center point lying midway between a plurality of respective source-receiver pairs that generated the traces in the first place. After application of time shifts to such traces (called static and dynamic corrections), a common midpoint (CMP) gather is created. Thereafter, the associated traces of that gather are stacked, to provide improved signal-to-noise characteristics.

(In regard to the importance of understanding the relationship between collection coordinates wherein traces are identified by either source-positions (s) and receiver-locations (g) coordinates along the line of survey, or by coordinates associated with source-to-receiver stations offset distance (f), and midpoint location (y) between respective source and receiver pairs, see, in detail, John F. Claerbout's book "FUNDAMENTALS OF GEOPHYSICAL DATA PROCESSING", McGraw-Hill, 1976 at pages 228 et seq.)

Even though the stacked gather of traces are enhanced (because of stacking), interpretations can still be made difficult due to the fact that at boundaries between different rock types, partial conversion occurs between one wave type and another, assuming the angle of the incident wave is greater than zero. For example, a P-incident wave can be partially converted to an Sv-reflected wave. Or an Sv-incident wave can be partially converted to a P-wave reflected signal.

While the Zeoppritz equations determine the amplitudes of the reflected and converted waves, they have been seldom used by interpreters of geophysical data in spite of the fact that modern seismic reflection collection methods such as CMP methods, use long offsets and involve significant angle of incidence. Reason: for deeper reflectors, the angles of incident are relatively low and the velocity and density contrasts between layers are assumed to be small. See for example, page 21 et seq of Kenneth H. Waters' book "A TOOL FOR ENERGY RESOURCE EXPLORATION", John Wiley and Sons, 1978 for further edification.

In addition, the complexity involved in applying such equations to the many different energy levels associated with the various reflected waves for all angles of incidence and various material contrasts that exit in the field, can generate so much data as to simply overwhelm the interpreter. He may find it too difficult to apply the Zoeppritz equations on a systematic basis especially where the field data is collected by modern CMP methods. In this regard, even though center points/reflection points may not be vertically aligned, the interpreter usually ignores that fact, viz., ignores the differences that in converted P-wave to Sv-wave path lengths measured about vertical projections through center points midway between respective source-receiver pairs.

That is to say, with conventional incident and reflected waves, reflection points of flat, horizontal reflectors are located directly below the vertical projections of the midpoints of respective source-receiver pairs associated with the traces of interest. Thus, traces associated with common reflection points (or depth points) on flat reflectors, although from different source-receiver pairs can be summed (staked), after appropriate corrections to align the traces. But with converted waves under the same circumstances, the reflection points are not located below projections from the midpoints of respective source-receiver pairs but instead are displaced a certain distance from those projections.

The closest prior art that I am aware of that describes the problem of non-symmetrical path lengths is found in "DIGITAL PROCESSING OF TRANSFORMED REFLECTED WAVES", SOVIET GEOLOGY AND GEOPHYSICS, V. 21, No. 4, pp. 51–59.

T. T. Nedfedkina et al there describe use of P-wave to Sv-converted waves in permafrost regions of Siberia and like regions. A stacking procedure for such converted waves teaches the advantage of varying the stacking point of the gathers in accordance with a series of normalizing values associated with a special Soviet digital processing code called "Kondakova's alpha-language". But since the procedure uses exotic processing terminology, inferior data sets, and similistic models, conventional use of their work in the context of modern exploration methods especially where dipping reflectors are contemplated, has not been possible.

SUMMARY OF THE INVENTION

In accordance with the present invention, non-symmetrical path lengths of primary incident waves and reflected converted waves, irrespective of whether or not the incident wave is a P-wave or an Sv-wave, is accounted for, so that converted Sv- or P-wave traces can be correctly collected into gathers where the traces associated with each gather sample essentially the same reflection point on a common target reflector. That is, the converted Sv- or P-wave traces can be identified in terms of common reflection points (CRP) coordinates that have been correctly transformed from source-point (SP) and detector station (D) coordinates so as to account for the non-symmetrical path lengths of the incident and converted waves.

The present invention is based in part on the fact that the non-symmetrical path lengths are a function of source type, the ratio of P-wave to S-wave velocities, i.e., Vp/Vs ratio of the overburden above the target reflector, as well as the dip angle and the depth of that reflector. In order to relate the aforementioned variables, the present invention contemplates simultaneous collection of conventional and converted P- or S-wave data in the field utilizing conventional common midpoint (CMP) collection methods. Such techniques involve sequential activation of a conventional seismic source located at a series of sourcepoint locations (SP) along a line of survey and redundantly collecting reflections of both the conventional waves and converted phases thereof via a series of multicomponent detectors. Such detectors are positioned along the line of survey at a plurality of detector stations (D) and separately but simultaneously record the motion of the earth in at least one horizontal direction (radial direction) as well as in the conventional vertical direction. Such detectors can be readily purchased from usual suppliers of geophysical equipment, such as Mark Products, Houston, Tex. As a result, each conventional and converted trace can be associated with a sourcepoint-detector station pair of known SP v. D coordinate location. Next, the conventional traces undergo coordinate transformation and enhancement so as to account (a) for different travel paths of the conventional wave in the overburden above the target reflector, and (b) for depth and dip of each target reflector. After the depth and dip of the target reflector have thus been determined, the invention adjusts the slope of imaginary straight gather lines on an (SP vs. D) coordinate stacking chart that connects common converted traces. Such adjustment takes into account the differences in path length and incident and reflection angles for the incident and reflected waves, as well as dip and depth of the target reflectors. Stacking of the reordered traces then occurs to form a true zero offset section.

Finally, the resulting zero offset section of converted traces can be displayed side-by-side with a zero offset section of conventional traces. Since both sections are preferably normalized to the same common horizontal coordinates along the line of survey, such a display has been found to improve resolution of high intensity amplitude events common to both sections to a surprising degree.

In accordance with the present invention, the common reflection point (CRP) coordinates for a gather of traces projected to a horizontal datum plane, relates to the sourcepoint (SP) and detector station (D) coordinates, in accordance with an equation of coordinate transformation selected from the group comprising:

Conversion $P-Sv$: $CRP = kD + (1-k)SP$

Conversion $Sv-P$: $CRP = (1-k)D + kSP$ where SP and D are source and detector coordinates, respectively; and k is a constant that takes into account the velocity ratio of the overburden, the dip angle $\alpha$ and depth (h) of the target reflector is the source-receiver offset distance X. $V_p$ and $V_s$ being P-wave and Sv-wave velocities, respectively, of the overburden.

An approximate formula for k which includes all these effects, is:

$$k = \frac{(V_p/V_s)}{[(V_p/V_s) + \{1 + (X/h)\sin\alpha\}(1+f)^{-\frac{1}{2}}]}$$

where $$f = \frac{[(V_p/V_s) - 1]}{[(V_p/V_s) + 1]} + (X/h)^2 \cos^2\alpha;$$

and Vp, Vs relate to the velocity ratio of the overburden; the dip angle ($\alpha$) the depth (h) and the source-to-receiver offset X are as defined above. This formula has been found to be accurate for dips up to $\alpha = 30°$, and offsets as large as twice the reflector depth, viz., 2h, and is also applicable to conventional waves, provided ($V_p/V_s$) is unity.

For many offset applications (where offset X is much less than depth h and the dip $\alpha$ is zero) k is approximated by $$k = \frac{(V_p/V_s)}{(V_p/V_s) + 1}$$

For the above, with flat target reflectors below an overburden of Vp/Vs = 2.4, k evaluation via the above equations reduce to $P-Sv$: $CRP = 0.73D + 0.27SP$ $Sv-P$: $CRP = 0.27D + 0.73SP$

DEFINITIONS

In the present invention, certain key terms related to collecting and processing multipoint seismic data will be used as defined below.

Assume that each CMP collected trace is described by the function W (SP,D) and that the source position coordinate (SP) and receiver location coordinate (D) are the independent variables.

In reality, the source position (SP) and receiver location (D) are not distributed in a continuum along the line (or axis) of survey defined by x-coordinates but are usually close enough together that it is merely a matter of interpolation to find W for any (SP) and (D) coordinates. Also, along the x-axis are the source-to-receiver distance offset coordinates (X) and common midpoint location coordinates (CMP's) that are orthogonal to each other but intersects the (SP,D) plane at a given angle depending on field collection parameters. If the incremental "roll" distance is $\Delta SP = \Delta D$, then the angle of intersection is 45 degrees and the offset and midpoint coordinates relate to the source and receiver coordinates in accordance with $$X = D - SP$$

$$CMP = (D + SP)/2.$$

BRIEF DESCRIPTION OF THE DRAWINGS

FIG. 1 is a plan view of a common midpoint (CMP) collection system illustrating how CMP data is conventionally collected in the field using, say, a line of detectors D1 . . . Dm in association with sources at sourcepoints $SP_1$ . . . $SP_n$ wherein source activation at $SP_1$ permits data to be recorded at detectors D1 . . . Dm and wherein source activation at SP2 allows data to be recorded at positions D2 . . . Dm+1;

FIGS. 2A-2D are vertical sections of an earth formation that has undergone surveying via the CMP collection system of FIG. 1 and illustrates in detail how conventional reflections are recorded for a source as well as illustrates the fact that without mode conversion at the reflector of interest, the path lengths of the incident and reflected wave are symmetrical about associated reflection points on a flat reflector so that traces associated with common midpoint centerpoints between respective source position-receiver locations are coincident, irrespective of whether or not the generated source wave is (i) a P-wave (FIG. 2A), (ii) an Sh-wave (FIG. 2B), or (iii) an Sv-wave (FIG. 2C), provided the associated receiver has a corresponding component response capability (FIG. 2D);

FIGS. 16-20$i$ are seismic sections and portions of sections illustrating the diagnostic capability of the method of the present invention in resolving complex structures in actual field examples;

PREFERRED EMBODIMENTS OF THE INVENTION

Figure 3:
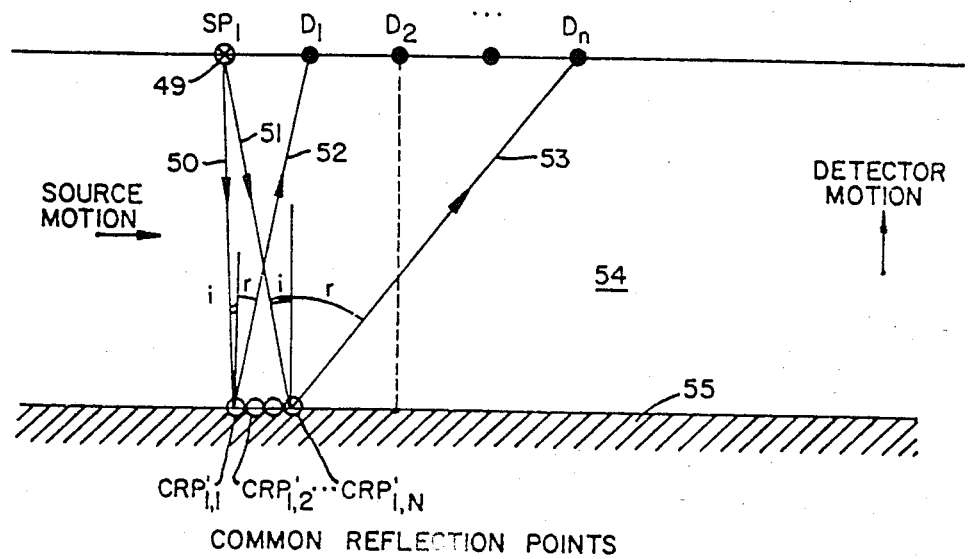
FIGS. 3 and 4 are vertical sections of an earth formation that has undergone surveying via the CMP collection system of FIG. 1 and illustrates in detail, the change in reflection point location as a function of the initial elastic wave propagation mode, (viz., whether it is a P-wave or Sv-wave) where target dip equals zero and depth, detector station coordinates D1 . . . Dn, and sourcepoint location coordinates SP1, remain constant.

Before discussion of embodiments of the present invention, a brief description of concepts behind it may prove beneficial and are presented below.

For conventional generated and received seismic waves, such as P-wave source generating P-waves recorded on vertically oriented receivers, the common reflection points (CRP's) for flat reflectors are vertical projections of the common midpoints between respective source-receiver pairs associated with the recorded traces. Such assumption are valid in exploration areas of limited structure or dip and allows the explorationist to gather seismic data conveniently and efficiently. For converted waves, however, the angles and incidence and relfection at subsurface reflectors are unequal. Result: the reflection point is not vertical projections of the midpoints between the source-receiver pair.

FIG. 1 is a plan view of a seismic collection system illustrating how terms of interest in this application are derived.

For example, the terms "centerpoint" and "midpoint" are a geographical location midway between a source coordinate, say, source position SP1 of a series of source positions $SP_1$ . . . $SP_4$ of a collection field system 10 and a series of receiver positions, say D1 of a series of receiver positions D1 . . . Dm at a datum horizon near the earth's surface coincident with line of survey 11. The centerpoints are designated C1 . . . C4, and each centerpoint is seen to be addressably associated with a selected source-detector pair that produced a given trace.

In common midpoint (CMP) collection, different sets of detector spreads are "rolled" forward in the direction of arrow 12 in associated with the like, incremental forward positioning of a sources at new positions along the line of survey 3. Energization at the series of positions then occurs in sequence. That is the source is excited in sequence at the source positions $SP_2$ . . . $SP_4$. Results: traces recorded at the different receiver locations can be related to selected midpoints within the surveyed subsurface. For example, if the reflecting interface is a flat horizon, the reflection point where reflection occurs will define vertical lines which pass through the centerpoints $C_1$ . . . $C_4$ of interest.

Applying static and dynamic corrections to a field trace is equivalent (under the above facts) to placing the source at the centerpoint, activating that source, followed by replacement with a detector at the same location and recording the trace. If all traces associated with a common midpoint are reformatted on a side-by-side basis, the resulting set of traces is termed a CMP gather. If the traces are summed, the resulting trace is a stacked CMP gather. Thus, there are at least two features of conventional CMP processing needed for seismic interpretation:

(i) by summing traces associated with a common subsurface point the signal-to-noise ratio (SNR) of the reflector on the resulting stacked gather is improved;

(ii) projections of subsurface reflection points intersects the midpoints of source-detector pairs of known coordinate locations (SP and D); hence, location of structural reflections are known if the incident and reflected path lengths are substantially equal;

FIGS. 2A–2C illustrate reflection phenomena of a three-layer model typical of young, shallow geologic section 20 consisting of a sandstone 21 between layers 22 and 23 as found in the Gulf Coast, illustrating that even if separate P-wave, Sh-wave or Sv-wave energy sources 28, 29 or 30 are located at source positions $SP_1$, $SP_2$, $SP_3$ in FIGS. 2A, 2B and 2C respectively, and then excited, the incident and reflected path lengths of the energy associated with each source-receiver pair will be substantially equal. This assumes that the receivers 31, 32, 33 at receiver positions D1, D2, D3 are set up to receive only the dominant energy of the generated wave. Vertical projections 34, 35, 36 of the common conventional reflection points CMP1, CMP2 or CMP3 intersect the centerpoints (midpoints) $C_1$, $C_2$, $C_3$ of the respective source position-receiver position pair coordinates, as shown.

In this regard, the term "conventional" is used to describe received energy at the receivers 31, 32, 33 in which the dominant particle motion matches that of the generated wave, whether the source generates P-wave, Sh-wave or Sv-wave energy in its principle mode of activation.

In FIG. 2A note that the source 28 at source location point $SP_1$ produces an incident wave that travels outwardly from that source location as a series of wave fronts. Each wave front defines a common spherical surface that joins points in the subsurface where motion is about to start. If the propagating medium has properties independent of position and direction of travel, the wave fronts form a set of concentric spheres centered at the source location. It is convenient to "track" such fronts using ray-tracing methods conventional in the art in which the energy of the fronts is conceived at traveling down into the earth along a large number of pyramids of infinitesimal cross-section; and the center line of any one such pyramid in a selected direction being regarded as a ray that traces paths 37, 38, 39. These paths pass through strata 21, 22 of the geologic section 20.

Note that at reflector 23, the angle of incidence of the incident wave is equal to the angle of reflection of the reflecting wave. Hence, incremental path length of the incident and reflecting wave in the overburden, i.e., in the strata 21, 22, are equal.

P-wave source 28 of FIG. 2A is typically a buried dynamite charge or a vibrator mounted on trucks which vibrate vertically on the ground surface. Most common shear sources (S-wave of FIGS. 2B, 2C) are a vibrator which shakes the ground sideways instead of up and down. In FIG. 2B, the Sh vibrator 29 shakes horizontally at right angles to the direction of the CMP collection arrow 12. If the vibrator is rotated horizontally 90° so that the motion is along the direction of arrow 12, as in FIG. 2C, the source 30 is called Sv-type shear motion. There is another difference between Sh- and Sv-wave energy.

In FIGS. 2A, 2B, and 2C, note also in strata 21, that the direction of particle motion of the incident and reflected energy, as shown via pairs of arrows 40a, 40b; 41a, 41b; and 42a, 42b, may (or may not) change as reflection from reflecting strata 23, occurs. In FIG. 2A, for example, the arrow 40a associated with the incident wave is directed downward along the path 37; while the reflected wave associated with arrow 40b is directly upwardly. Similarly, in FIG. 2C, the arrow 42a associated with the incident wave is directed upward and away from the path 39 (at right angles thereto); while the reflected wave is directed in downwardly relative to the ray path. On the other hand, in FIG. 2B, the arrow 41a of the incident wave defines particle motions that is perpendicular to the plane of the FIG. Since the particle motion is parallel to the reflecting surface, Sh-waves suffer no mode conversion on reflection or refraction from the target reflector. That is to say, Sh source 29 would generate rays of energy which upon reflection off flat beds, would produce only Sh waves, which, when recorded by receiver 32, would require only that the receiver 32 be oriented at right angles to the collection survey arrow 12.

On the other hand, P-waves and Sv-waves incident on a reflector produce not only like-type, conventional waves, but also generate converted waves. When both wave types arrive at the surface, Sv reflections are recorded on the radial horizontal motion segment of the receivers 31, 33 whereas the P-waves are recorded mainly on the vertical response segment of the detectors.

FIG. 2D illustrates how the dominant response directions of the receivers 31, 32 and 33, can be matched to respond to the particle motion of the upcoming P- or S-wave energy.

As shown, if the response direction of the receivers 31, 32, 33 is vertical with respect to the earth's gravitational field, say along arrow 43, then any upcoming P-wave energy would be detected; if the receiver response is horizontal in the direction of arrow 44, then any upcoming Sh energy would be detected; similarly, if the response direction is horizontal in the direction of arrow 45, any Sv upcoming energy will be likewise detected.

Figure 4:
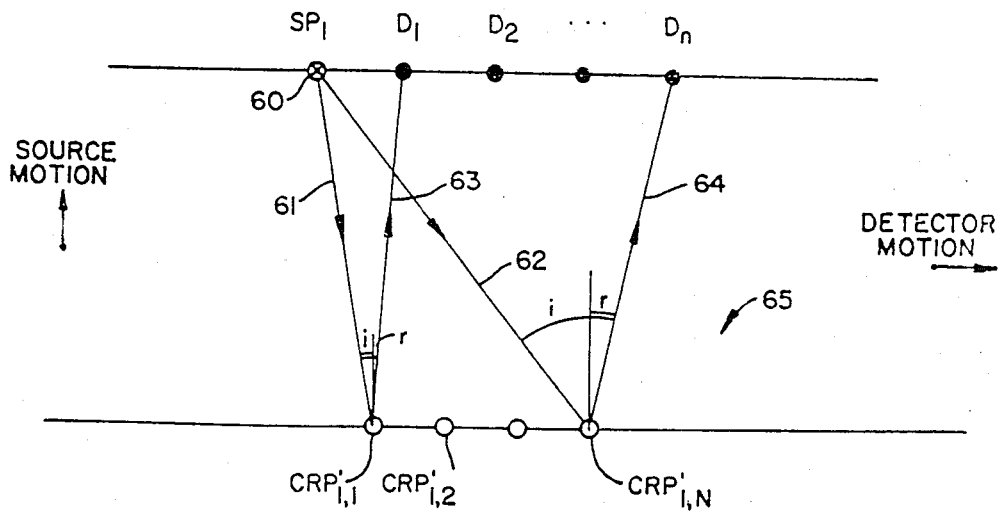

FIGS. 3 and 4 illustrate that the reflection point of flat reflector (for converted waves), is not a vertical projection of the midpoint between respective source-receiver pairs.

In FIG. 3, source 49 at sourcepoint $SP_1$ produces an Sv-wave whose wave fronts that trace out incident ray paths 50, 51 and reflective paths 52, 53, respectively, in overburden 54. Reflections from reflector 55 are at points $CRP_1$, $CRP_2$ ... $CRP'_n$. Due to the production of converted P-wave reflections at reflector 55, the reflection angle (r) of the converted P-wave is seen to be greater than that for the incident angle (i). Note also that at large incident angles, not only is the amplitude of the converted P-wave increased, but also the reflection point $CRP'_n$ at the reflector 55 is not aligned with a vertical projection through the midpoint formed between the respective source-receiver pair, i.e., midway between source-point $SP_1$ and receiver position $D_n$.

FIG. 4 illustrates the same principle but in a reciprocal manner.

As shown, P-wave source 60 located at source-point $SP_1$ is seen to produce P-waves whose wave fronts trace out incident ray paths 61, 62 and reflection paths 63, 64 in overburden 65. However, the slopes of these paths are seen to be reversed from those depicted in FIG. 3. Due to the production of converted Sv-waves at reflection points $CRP'_1$, $CRP'_2$ and $CRP'_n$, the reflection angles (r) are less than the incident angles (i). But also note that the degree of inequality (between the incident and reflection angles) becomes greater with offset. Amplitude of the converted wave similarly increases.

Returning to FIG. 1, it should now be recalled that the detectors at stations $D_1$, $D_2$ ... $D_m$ and sources at sourcepoints $SP_1$, $SP_2$ ... $SP_4$ are used in redundant fashion so that the similar source and receiver coordinates relate a number of generated traces. Starting with activation of the source at sourcepoint $SP_1$, energy is detected at receiver positions $D_1$ ... $D_m$ wherein ground motion is recorded for a specific time period, often 6 seconds. Such a time period allow enough time for energy to travel down and be reflected upward from reflectors to the detectors at stations $D_1$ ... $D_m$. Next, the source is "rolled" forward to sourcepoint $SP_2$ and activated. While at the same time the detectors are positioned at stations $D_2$, $D_3$ ... $D_{m+1}$ to record reflections. As the above-described sequence is repeated in the direction of arrow 12 along the line of survey 13, the result is a series of overlapping trace records that can be identified with redundant source and receiver coordinates and similarly sampled reflection points, as previously discussed.

Figure 5:
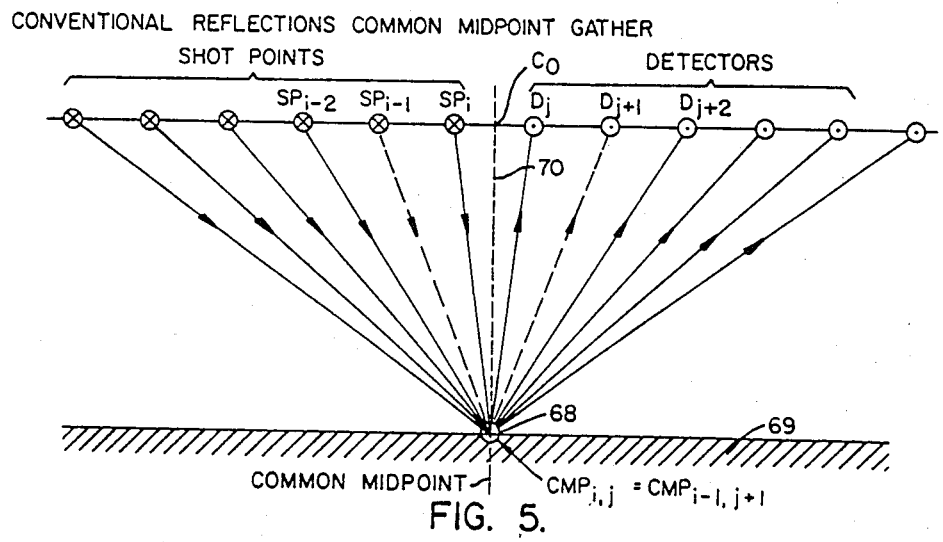
FIGS. 5 and 6 are sections of an earth formation illustrating in detail that traces associated with a common midpoint gather are coincident (or non-coincident) with an associated common depth point on a flat reflector, depending upon the fact whether or not wave conversion has (or has not) occurred.

FIG. 5 illustrates how conventional, non-converted traces associated with different sets of source-receiver pairs, sample the same reflection point on a target reflector.

As shown, note that common reflection point 68 is located on flat reflector 69 in vertical alignment with imaginary projectoin 70 that passes through the centerpoint Co between all possible source-detector pairs. The common reflection point 68 for the illustrated group of source-detector pairs, is, of course, derived by tracing the wave ray from its sourcepoint $SP_1$, $SP_1-1$, $SP_1-2$ ... down to the reflector 69 and then upward to its particular detector station Dj, Dj+1, Dj+2 ... Thus, coordinates of the common midpoint equals all possible coordinates of pairs of source and detector positions with the same average value. Or $$CMP_{i,j} = CMP_{i-1,j+1} = CMP_{i-2,j+2} = \ldots \quad (I)$$

for as many pairs as sample the same reflection point 68. Further observations can be ascertained in conjunction with FIG. 5.

E.g., note that even though the path lengths of the rays associated with different source-receiver pairs are substantially different, the path lengths of the incident and reflection waves of any one pair are identical. And, for that one pair, the angle of incidence equal the angle of reflection at reflector 69. When the traces associated with these source-detector pairs are transformed into common midpoint gathers, the resulting stacked traces are said to sample the same reflection point on any flat target reflector wherein, the coordinates of the reflection relate to the sourcepoint (SP) and detector station (D) coordinates in accordance with an equation of coordinate transformation of the forms:

$$CMP_{i,j} = [(SP)i + (D)j]/2 \quad (II)$$

Figure 6:
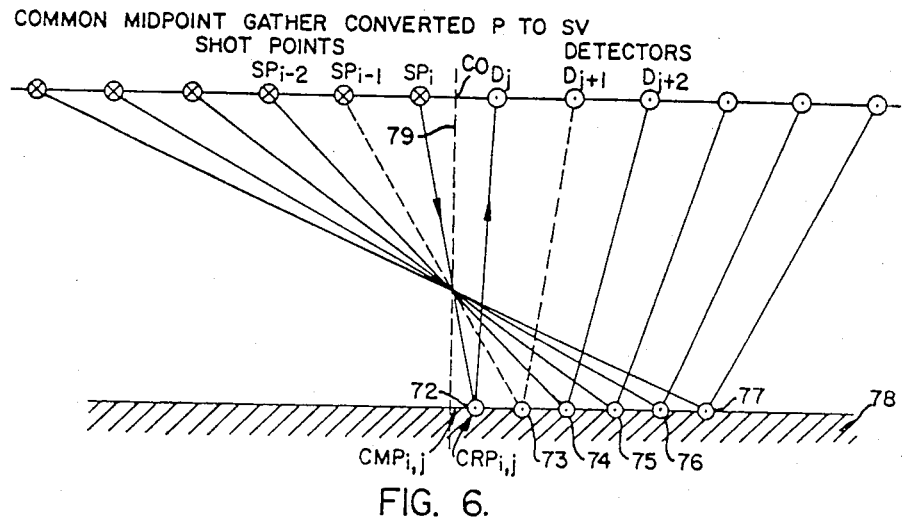

FIG. 6 illustrates the fact that converted waves recorded at stations Dj, Dj+1 ... do not provide reflection points that are vertically aligned with midpoint coordinates of the respective source-detector pairs from which the traces are derived.

As shown, the reflection points 72, 73, 74, 75, 76 and 77 on flat reflector 78 are shown not to be alignable with the vertical projection 79 that passes through centerpoint Co of all the source-detector pairs at the earth's surface. Reasons for this occurrence are set forth briefly below.

For converted P- to Sv-waves, the angle of reflection r for the converted Sv ray does not equal the incident angle i for the P-ray. Due to application of Snell's Law which holds for rays in optics, acoustics as well as elastic wave propagation in the earth. Snell's Law states that angles (i) and (r) are related by the velocity of propagation of the incident and reflected waves. In this case the relation is $$\sin (r)/\sin (i) = Vs/Vp \quad (III)$$

where Vp and Vs are the velocities of compressional and shear velocities, respectively, in the overburden above the reflection point.

In solid materials, like sedimentary rocks, the P-wave velocity, Vp, is always greater than the shear wave velocity, Vs, often by a factor of about 2. This causes the angle (r) to always be less than the incident angle (i). As a result, actual reflection points 73–77 are not vetically alignable with the midpoint coordinate between the source-receiver pairs.

That is to say, the actual reflection points of converted P- to Sv-wave are biased away from common midpoint location $CMP_1$, on reflector 78 by selected amounts in the direction of the detector locations. If the converted wave data recorded by these pairs of sources and detectors is conventionally is time shifted to bring about alignment about projection 79. Then there is a loss of resolution laterally because of smearing of these points over the target reflector.

In accordance with the present invention, the asymmetry of the incident and reflected ray paths are compensated for so the common reflection points (CRP's) of target reflectors truly correspond to known sourcepoint (SP)—detector station (D) coordinates of CMP collection system along the line of survey.

Briefly, the method of the present invention, involves three basic steps:

The first is a ray tracing calculation for conventional (unconverted) waves through a layered structure. By numerical iteration a series of target reflectors is positioned as to dip, depth, and as events along the time axis of each trace. The reflection points for unconverted waves are calculated using midpoint coordinate transformation steps augment to account for reflector depth and dip. By a geometric trick, the starting ray path of the iteration is guessed using the rms velocity of the hyberbolic moveout formula.

The second step involves usng the reflector dip and depth of step one, supra, followed by choosing the right combination of source and detector coordinates so that trace gathers sample the same reflection point in the subsurface for converted waves. This fortunately, turns out to be a tilted straight gather line on the (SP v. D) stacking chart of FIG. 13 rotated with respect to the conventional phase stacking lines. To implement this gathering of data requires a relatively straightforward coordinate transformation, re-addressing program which sorts data by common reflection points (CRP's) rather than by common midpoint coordinates.

The third step involves the display of the resulting zero offset section of converted traces of step two, supra, side-by-side with the zero offset section for conventional waves in accordance with step one, supra. Both sections are indexed as to be normalized to the same horizontal coordinates along the line of survey.

Before the method of the present invention is described in detail, a brief discussion of two different sets of field coordinate systems used in connection with the present invention, is beneficial to understanding certain aspects of the invention and is presented below in connection with FIG. 7.

Figure 7:
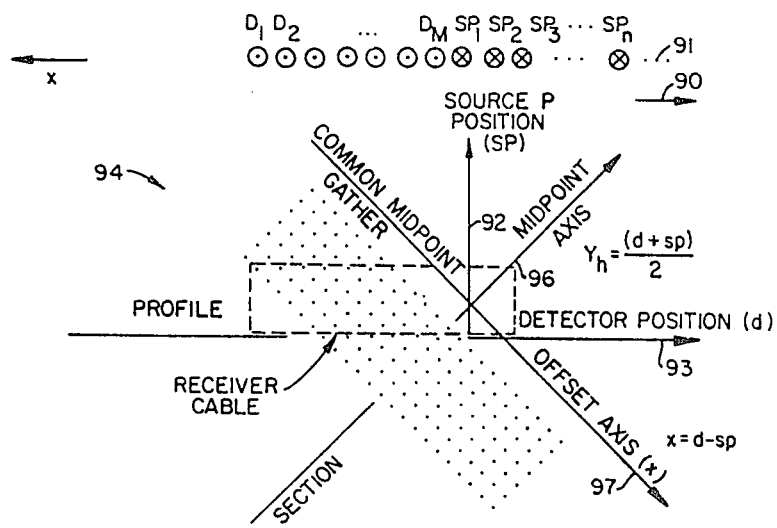
FIG. 7 is a stacking chart wherein source-receiver coordinates associated with traces produced by CMP collection steps, are superimposed upon a common midpoint v. offset coordinate system to better illustrated processes associated with the method of the present invention.

As shown across the top of the FIG. 7 is a plan view of a CMP collection system similar to that depicted in FIG. 1 except that the source point locations SP1, SP2 precede the advance of the spread of detectors D1, D2 . . . Dm, instead of trailing the spread as previously shown. Direction of advancement is in the direction of arrow 90 along line of survey 91. As a result of similar incremental advances between spread and source positions, say, each is advanced one incremental position per collection cycle, so that $\Delta SP = \Delta D$, traces can be associated not only with respective source (SP) and receiver (D) locations via orthogonal axes 92 and 93, respectively, on stacking chart 94 but also they can be identified with common midpoint (CMP) and offset (X) coordinates that lie along orthogonal axes 96, 97, in accordance with the equations of coordinate transformation previously set forth, viz., $$CMP = (D + SP)/2,$$

$$X = D - SP.$$

Since transformation of coordinates for converted waves varies substantially from these formulas, a brief discussion of the theoretical basis for carrying out transformation of coordinates of converted traces in accordance with present invention will now be discussed.

Briefly, in this regard, transformation equations involving flat reflectors will be initially developed followed by a detailed discussion of the derivation of transformation equations related to dipping reflectors.

RAY TRACING OF CONVERTED WAVES FOR FLAT REFLECTORS

For conventional phases such as P-wave generated and then recorded on vertically responding receivers, the common reflection points (CRP's) are assumed to be the common midpoints (CMP's) between associated source and receiver pairs. For a given offset coordinate, say, at a given offset along axis 97 of FIG. 7, traces associated with a given midpoint and is coordinate 96, can be concurrently gathered. That is to say, in areas of no structure or dip CMP data can be conveniently gathered in accordance with the midpoint coordinates of each source-receiver pair and then processed through NMO correction, statics and stacking to provide accurate final seismic sections.

For converted waves, however, since the angles of incidence and reflection are unequal, the reflection points associated on each target are not alignable with the above-mentioned midpoint loations. But such misalignment can be accurately determined—and then eliminated—in accordance with the steps of the present invention.

Figure 8:
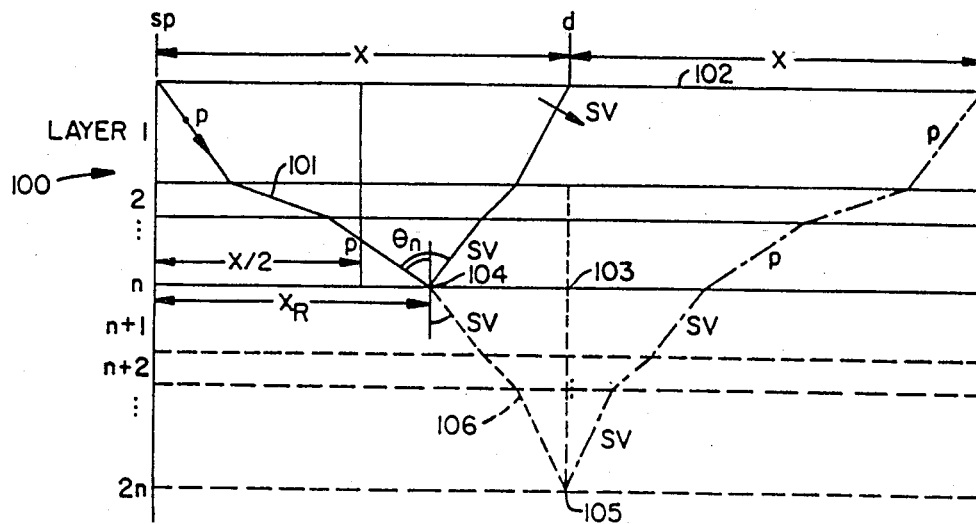
FIGS. 8-11 are sections of an earth formation illustrating in detail ray trace modeling techniques used in accordance with the present invention to determine the degree of change of reflection points along flat reflectors (FIG. 8) and along dipping reflectors (FIGS. 9-11) as a function of offset, as elastic wave conversion occurs.

FIG. 8 illustrates conversion ray tracing aspects of the present invention to bring about alignment.

As shown, there is a stack of layers generally indicated at 100, i.e., layers 1, 2, 3 . . . n, a portion of which represents the overburden. Solid line 101 indicates the ray path of an incident P-wave generated by a source at coordinate SP at the earth's surface 102, and a converted P- to Sv-wave that is reflected from interface 103 of layer n at reflection point 104. The reflection is recorded at a receiver located at location D.

For a given receiver-offset distance X between the source coordinate (SP) and receiver coordinate (D), the coordinates of the ray is to be determined, and the reflection offset distance Xr can be determined. The Sv-P conversion problem is a mirror image of that depicted in FIG. 8 but has the same general solution for incident angles in each layer.

Briefly, in order to find the incident angles to map the ray, the present invention revamps ray tracing from solving a reflection problem to solving a transmission problem. This can be done in FIG. 8 by constructing a mirror image of the reflected Sv rays about interface 103. In that way, the total path of the ray appears to be equivalent of downward transmission through two sets of layers, i.e., layers 1, . . . n and layers n+1, n+2, . . . 2n before reflection at reflection point 105 occurs. That is, along the downward segments of solid line 101 and dash-dotted line 106 as shown.

Note the upper set of layers is associated with P-wave overburden velocities only, while the lower set of layers is related to Sv velocities only.

If the layers are numbered from top to bottom as shown and assigned the correct velocities, angles and thicknesses total offset distance X and travel time T for the ray is:

$$X = \sum_{i=1}^{2n} h_i \tan \theta_i \tag{1}$$

$$T = \sum_{i=1}^{2n} h_i \cos^{-1} \theta_i / v_i \tag{2}$$

To find the angles of incidence $\theta_1, \theta_2 \ldots \theta_i$ in the layers, the travel time T for the path is minimized by the constraint that the offset X be fixed. This will determine the ray parameter p from which all angles can be computed by Snell's law.

In this regard, Taner and Koehler (1966) described a tenchnique for tracing conventional reflections only (but not for converted waves and not by transmission paths) that is of interest ("VELOCITY SPECTRA-DIGITAL COMPUTER DERIVATION AND APPLICATIONS OF VELOCITY FUNCTIONS", Geophysics, Vol. 34, pp. 859-881.)

The functional (F) is next defined.

$$F = T - px \tag{3}$$

$$F = \sum_{i=1}^{2n} (h_i v_i \{ ((\tan^2 \theta_i + 1)^{\frac{1}{2}} - p v_i \tan \theta_i \} \tag{4}$$

where p is a variational parameter.

To minimize T with a fixed offset X, the differential of F is taken and set to equal to 0, i.e.

$$\delta F = \sum_{i=1}^{2n} (h_i / v_i) \{ \tan \theta_i / (\tan^2 \theta_i + 1)^{\frac{1}{2}} - p v_i \} \delta \tan \theta_i$$

This is possible for arbitrary angle differentials only if $$pv_i = 1/(1+\cot^2\theta_i)^{\frac{1}{2}} = \sin\theta_i \tag{5}$$

i.e., Snell's Law applies, where p is the ray parameter with units of apparent horizontal slowness. This can also be written as $$\sin\theta_i = pv_i = v_i/C \tag{6}$$

where c is the unknown horizontal velocity of the ray. Substituting this for the angles in equation 1 a single equation for c is obtained.

$$X = \sum_{i=1}^{2n} h_i v_i/(c^2 - v_i^2)^{\frac{1}{2}} \tag{7}$$

This equation has no algebraic solution for c, but is solvable numerically by iteration, requiring an initial guess for the ray path which will allow the method to iterate to a solution. In accordance with the present invention, the hyperbolic moveout formula gives surprisingly good starting values for c in the manner set forth below.

Referring again to FIG. 8, total transmission path through the two sets of layers is seen to be simply half of a two-way conventional reflection path down to interface 2n and back up to the surface. The upgoing reflection would arrive at offset 2X. Standard NMO formulas can estimate arrival times and slownesses in terms of rms velocities down to interface 2n. One-way times to interface 2n at offset X are obtained from the same moveout formula by just dividing the distance and time variables by two.

Thus, for our converted reflection problem, the approximate formula is $$T^2 \approx T^2_{ps} + (X/V_{ps})^2 \tag{8}$$

where $T_{ps}$ is the two-way zero offset time for the converted reflections equal to $$T_{ps} = \sum_{i=1}^{2n} h_i/v_i \tag{9}$$

and $V_{ps}$ is the rms velocity equal to $$V_{ps} = \left[\left(\sum_{i=1}^{2n} v_i^2 t_i\right) / \left(\sum_{i=1}^{2n} t_i\right)\right]^{\frac{1}{2}} \tag{10}$$

In expression (10) the $t_i$'s are one-way layer times given by $$t_i = h_i/v_i \tag{11}$$

where P times are obtained for i from 1 to n and Sv times for i from n+1 to 2n.

From equation (8) an initial guess of $c_o$ can be made for the apparent horizontal velocity of the ray. Or, $$c_o = dX/dT = V_{ps}[T^2_{ps} + (X/V_{ps})^2]^{\frac{1}{2}}/(X/V_{ps}) \tag{12}$$

Note that $c_o$ is infinity at zero offset and decreases asymptotically to $V_{ps}$ as X goes to infinity.

To find the exact value of c for the layered model $c_o$ is substituted into equation (7) and iterations are made toward as accurate a solution as required.

With c determined, the reflection point offset $X_r$ can be calculated by equation (7) but summing i only up to n, provides, $$X_r = \sum_{i=1}^{n} h_i v_i/(c^2 - v_i^2)^{\frac{1}{2}} \tag{13}$$

The converted wave rms velocity can be related to the separate P and Sv rms velocities measured on the separate unconverted reflections. If $T_p$ and $T_s$ are the two-way, zero offset times for the unconverted events, then the converted wave rms velocity in equation (10) can be written as $$V_{ps} = \{(T_p V^2_p + T_s V^2_s)/(T_p + T_s)\}^{\frac{1}{2}} \tag{14}$$

where $V_p$ and $V_s$ are the rms velocities for P- and Sv-waves, respectively, down to interface n, obtained from cores of adjacent wells or by other conventional means.

Expression (14) shows that $V^2_{ps}$ is a weighted average of the mean squared velocities $V^2_p$ and $V^2_s$, so that in principle, correlations between conventional P and Sv phases and converted velocities and times for identification purposes, can be made.

Note also that the converted wave problem has now been replaced by an equivalent conventional moveout problem. Velocity variations are quite extreme since P and Sv velocities are a mixed function.

It is of interest that for a single layer case equation (14) can be further reduced. Since the rms velocities for small offsets equal the true P and Sv velocities, $h_1 = T_p V_p = T_s V_s$. Substituting these equalities into equation (14) $V_{ps}$ varies in accordance with $$V_{ps} = (V_p V_s)^{\frac{1}{2}} \tag{15}$$

for the converted wave rms velocity to be used in equation (12).

Coordinates of the reflection points can now be estimated. The lateral shift from the midpoint is preferable used for a single layer using Snell's Law.

If the horizontal offset X from the source coordinate (D) to detector position (SP) is defined as $$X = D_j - SP_i \tag{16}$$

then the actual reflection point offset Xr, can be defined in terms of a ratio of these two quantities:

$$R = X_r/(X/2) \tag{17}$$
$$= 2\tan\theta_p/(\tan\theta_p + \tan\theta_{sv})$$

where $\theta_p$ is the angle of incidence and $\theta_{sv}$ is the angle of reflection. Multiplying top and bottom by $\cos\theta_p$ and using Snell's Law, yields:

$$R = 2(V_p/V_s)/(V_p/V_s + \cos\theta_p/\cos\theta_{sv}) \tag{18}$$

Taking a power series expansion for each cosine term and using Snell's Law and simplifying $$R = 2(V_p/V_s)/\{(V_p/V_s + 1 - (\theta_p^2/2)(1 - (V_p/V_s)^{-2})\} \tag{19}$$

where $\theta_p$ is the incident angle in radians.

The approximate ratio of reflection point offset Xr to midpoint offset X/2 is accurate up to $\theta_p = \pi/4 = 45$ degrees. For offsets X less than the reflector depth the term in $\theta_p$ can be ignored, so that $$R = 2(V_p/V_s)/(V_p/V_s + 1) \tag{20}$$

Note that the ratio R depends only on the $(V_p/V_s)$ ratio for all reflectors deeper than the offset distance.

Expression (20) hence can be used to gather traces associated with selected pairs of source-receiver pairs having events thereon which sample the same point on an interface in the following manner.

Recall that for conventional waves for which angles $\theta_p$ and $\theta_{sv}$ are equal so that the reflection point $$\begin{aligned} CRP_{i,j} &= SP_i + .5 (D_j - SP_i) \\ &= .5 (D_j + SP_i) \end{aligned} \tag{21}$$

For converted P to Sv reflections the reflection point offset is $$CRP_{i,j} = SP + 0.5R(D_j - SP_i)$$

The above transformation can be thought of as a process for determining the reflection point coordinate projected to the horizontal datum plane via multiplying a constant (k) that takes into account the velocity ratio of the overburden times the (SP) and (D) coordinates of respective source-receiver pairs in accordance with $$CRP_{i,j} = kD_j + (1-k)SP_i \tag{22}$$

where $$k = R/2 = (V_p/V_s)/(V_p/V_s + 1) \tag{23}$$

From equation (22) it can be seen that the actual reflection points for converted waves equal a weighted average of source and detector location coordinates where the weights add to unity. For conventional reflections the weights are each 0.5 and sum to 1. Because of Expressions (22) and (23), traces that are associated with pairs of source and detectors coordinates can be gathered for a known reflection point locations CRP.

From Expressions (22) and (23) note that is only a function of $V_p/V_s$ ratio for the earth above the reflectior, i.e., the $V_p/V_s$ ratio of the overburden, if that reflector is flat. However, if the reflector is dipping at an angle $\alpha$ with a horizontal line normal to the earth's gravitational field (instead of being flat), then the formulas for the reflection point coordinates $CRP_{i,j}$ are more complex.

RAY TRACING CONVENTIONAL AND CONVERTED WAVES FOR DIPPING REFLECTORS

Figure 9:
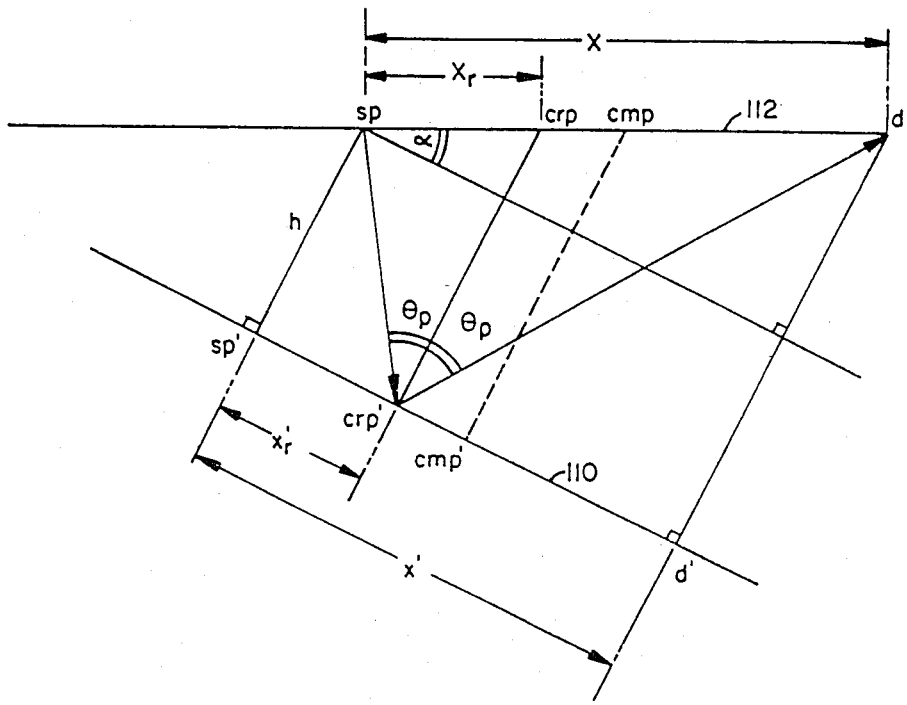

FIG. 9 shows the geometrical relationships of reflection points CRP's for converted waves off a dipping layer 110. The parameter k for this case depends on two factors, dip angle $\alpha$, and offset to depth ratio X/h. An exact formula for k is thus:

$$k = \tfrac{1}{2}[1 + (X/2h) \sin \alpha] \tag{24}$$

the total Expression (24), supra, being developed as follows.

A source is at position coordinate (SP) shooting down dip into a receiver at receiver position (D). While for conventional reflections the incident and reflected angles at the dipping interface 110 are equal, they are not so for converted waves. Purpose of the following expressions: To find a relation between the actual reflection point offset Xr' along the interface 110 and the midpoint offset X'/2 along the same interface as measured from coordinates s' and d' which are the image points on that interface 110 projected from the surface poins SP and d, respectively.

R can be defined as the ratio of reflection point offset to midpoint offset at the earth's surface as 112 actualy recorded. By geometry the same ratio in dipping coordinates along the interface 110 is equal to $$R = Xr/(X/2) = Xr'/(X'/2) \tag{25}$$

If the dip angle $\alpha$ were zero, $Xr' = X'/2$ and R would equal 1 as expected. From the geometry in FIG. 9 since $$Xr' = h \tan \theta_p$$

$$X' = (2 h + X \sin \alpha) \tan \theta_p \tag{26}$$

Substituting these expressions yields k is $$k = R/2 = \tfrac{1}{2}[1 + (X/2 h) \sin \alpha] \tag{27}$$

For zero dip equation expression (27) reduces to R = 1, which means that the true reflection point equals the midpoint location between source and receiver. For non-zero dip this equation is convenient to use for estimating the location of the true reflection point as a coupled function of dip, offset and depth.

Then, since k = R/2, according to Expression (22), the true reflection points $CRP_{i,j}$ for conventional waves can be stated as $CRP_{i,j} = kD_j + (1-k)SP_i$.

But expression (27) deals only with conventional reflections at interface 110, and does not involve converted reflections.

Figure 10:
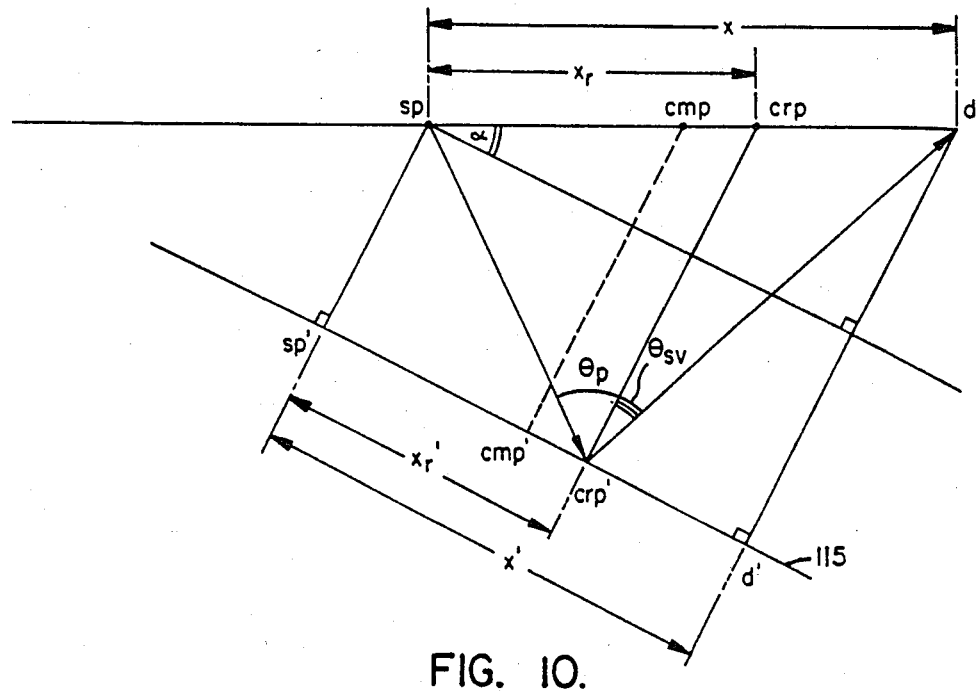

FIG. 10 illustrates the geometrical relationships of converted ray paths with respect to a dipping interface 115. In this case, the parameter k depends on three factors, $V_p/V_s$ ratio, dip angle $\alpha$, and offset to depth ratio X/h. An exact formula for k is thus:

$$k = \frac{(V_p/V_s)}{\{(V_p/V_s) + [1 + (X/h) \sin \alpha] [1 + f]^{-1}\}} \tag{28}$$

where $$f = \frac{[(V_p/V_s) - 1]}{[(V_p/V_s) + 1]} \tag{29}$$

the total expression (28), supra, being developed as follows.

Note first in FIG. 10 that the angle of incidence $(\theta_p)$ and the angle of reflection $(\theta_{sv})$ are no longer equal. Hence $$Xr' = h \tan \theta_p \tag{30}$$

and $$X' = h \tan \theta_p + (h + X \sin \alpha) \tan \theta_{sv} \tag{31}$$

$$X' = h \tan \theta_p (1 + (X/h) \sin \alpha) \tan \theta_{sv}/\tan \theta_p)$$

Substituting these into equation (25) yields $$R = 2/\{1 + [1 + (X/h) \sin \alpha] \tan \theta_{sv}/\tan \theta_p\} \tag{32}$$

Except for the ratio of tangents this formula is similar to that derived for conventional reflections.

Equation (32) is exact, but the tangent ratio cannot be determined exactly without an iterative ray tracing. However, a simple approximation can be made which gives very close answers.

Figure 11:
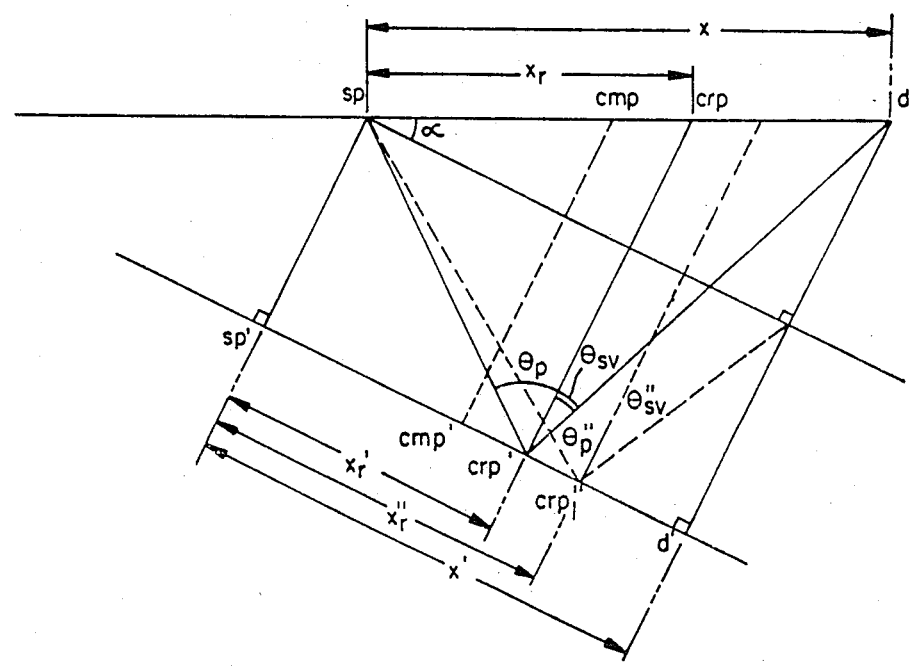

If the reflection point is moved from CRP' to CRP'' as in FIG. 11, then both incident and reflection angles increase from $\theta_p$ to $\theta_p''$ and from $\theta_{sv}$ to $\theta_{sv}''$ respectively. However, the ratio of tangent angles changes very slightly so that to a good approximation $$\tan\theta_{sv}/\tan\theta_p \cong \tan\theta_{sv}''/\tan\theta_p'' \tag{33}$$

As the reflector depth increases, this approximation becomes more accurate. Then from FIG. 11, $$\cos\theta_p'' = h/(h^2+X_r''^2)^{\frac{1}{2}} \tag{34}$$

$$\sin\theta_p'' = X_r''/(h^2+X_r''^2)^{\frac{1}{2}} \tag{35}$$

where (for deep layers)

$$X_r'' = (V_p/V_s)X\cos\alpha/(V_p/V_s+1) \tag{36}$$

Snell's Law states that incident and reflected angles are related by $$\sin\theta_{sv}'' = (V_s/V_p)\sin\theta_p'' \tag{37}$$

Using Snell's Law twice, the ratio of tangents for the perturbed angles can be calculated by $$\tan\theta_{sv}''/\tan\theta_p'' = (V_s/V_p)\cos\theta_p''/\cos\theta_{sv}'' = (V_s/V_p)\cos\theta_p''[1-(V_s/V_p)^2\sin^2\theta_p'']^{-\frac{1}{2}} \tag{38}$$

Substituting (34) and (35) into this equation for $\cos\theta_p''$ and $\sin\theta_p''$ after algebraic simplification, yields:

$$\tan\theta_{sv}''/\tan\theta_p'' = (V_s/V_p)\cdot[1+f]^{-\frac{1}{2}} \tag{39}$$

where $$f = (X_r''/h)^2(1-(V_s/V_p)^2) \tag{40}$$

To express f in terms of surface offset distances X substitute (36) into this equation, which yields:

$$f = \frac{[(V_p/V_s)-1]}{[(V_p/V_s)+1]}(X/h)^2\cos^2\alpha \tag{41}$$

Finally, the parameter k=R/2 is obtained by substituting the tangent ratio of (39) into (32), thus giving $$\frac{(V_p/V_s)}{\{(V_p/V_s)+[1+(X/h)\sin\alpha][1+f]^{-\frac{1}{2}}\}} \tag{42}$$

From this derivation, it is observed that equations (41) and (42) verify the formulas originally stated in equations (29) and (28).

Although the formula for k is complex, it is also quite general and reduces to simpler forms for both converted and conventional waves, in conjunction with and without dipping reflectors.

By setting $(V_p/V_s)$ to equal to 1, yields the conventional wave formula for k in the dipping layer case (because the incident and reflected waves are the same type). From equation (41) it is seen that f goes to 0, hence k in (42) reduces to $$k = \frac{1}{2}[1+(X/2h)\sin\alpha] \tag{43}$$

which agrees with (24), previously derived for conventional waves.

For converted waves, setting the dip angle $\alpha=0$ reduces the parameter k to the formula:

$$\frac{(V_p/V_s)}{\{(V_p/V_s)+[1+f]^{-\frac{1}{2}}\}} \tag{44}$$

where $$f = \frac{[(V_p/V_s)-1]}{[(V_p/V_s)+1]}(X/h)^2 \tag{45}$$

The effect of f in this expression is to correct for offset variations in X which become important when X is as large as the depth to reflector h.

If the user is interested in only near offset conditions, where the X/h ratio is much less than 1, then f can be set equal to 0, causing k to be further simplified to $$k = V_p/V_s/(V_p/V_s+1) \tag{46}$$

which is the least complex approximation in the method of the present invention, useful for short offsets in zero dip areas. This expression for k was developed earlier for equation (23).

From the above development it is also seen that the parameter k can be calculated for conventional and converted waves including the effects of offset to depth ratio (X/h) dip angle $\alpha$, and velocity ratio $V_p/V_s$. Thus, k is a general function of these three parameters $$k = k(X/h, V_p/V_s, \alpha) \tag{47}$$

which can be calculated for any case of interest. As described earlier, k is required to calculate the common reflection points (CRP) for each type of wave.

DETAILED DESCRIPTION OF THE METHOD OF THE PRESENT INVENTION

Now, having a firm theoretical foundation, the steps for carrying out the method can be set forth in detail in conjunction with FIGS. 12, 13, 14 and 15.

Figure 12:
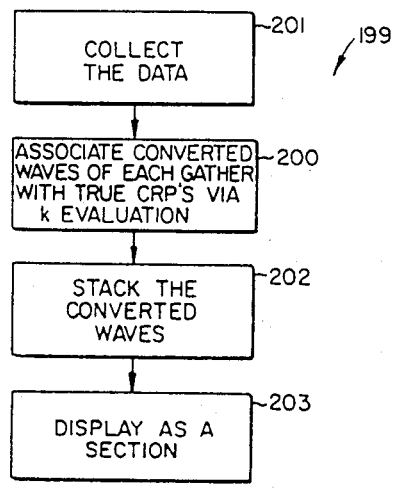
FIG. 12 illustrates a process for carrying the method of the present invention using a properly programmed digital computer wherein converted traces can be gathered along proper gather lines to account for non-symmetrical travel paths of incident and reflected rays using a selected euqation of coordinate transformation.

FIG. 12 illustrates how transformation of a series of field traces in accordance with the present invention occurs. It represents an overall viewpoint.

As shown, flow chart 199 sets forth the desired sequence of steps controlling the operation of a digital computer, such as an IBM Model 3033, involving at least the transformation and reordering of converted traces associated with source-detector pairs of known sourcepoint-detector station coordinate locations (SP,D), using an equation of transformation for associated common reflection points (CRP's) selected from the group comprising:

$$CRP = kD + (1-k)SP: \text{ for conversions of } P\text{-waves to } Sv\text{-waves at the target;}$$
$$CRP = (1-k)D + kSP: \text{ for conversions of } Sv\text{-waves to } P\text{-waves at the target;}$$

where $$k = \frac{(V_p/V_s)}{[(V_p/V_s) + \{1 + (X/h) \sin \alpha\}(1 + f)^{-\frac{1}{2}}]};$$

$$f = \frac{[(V_p/V_s) - 1]}{[(V_p/V_s) + 1]} (X/h)^2 \cos^2 \alpha;$$

Vp and Vs are the P-wave and Sv-wave velocities, respectively, of the overburden;
X is the source-receiver offset distance;
h is the depth of the target reflector;
α is the dip angle of the target reflector; and
SP and D are source and detector coordinates, respectively, along the line of survey.

As a result of evaluation centering about determining variable "k" as a function of velocity ratios in the overburden, the dip angle and depth (h) of the target reflector and the source-receiver offset distance X transformation occurs whereby signals of greater intelligibility and clarity for geophysical interpretation, are subsequently provided. Note that while chart 199 sets forth the method of the present invention in general terms, a programmer of ordinary skill in conventional CMP collection and processing techniques in addition to the aforementioned transformation equations, can program most convention computers in a rather short time span to carry out the goals and objects of the invention. Typical programming language, is FORTRAN.

Although instruction 200 is the key to the transforming of source (SP) and receiver (D) coordinates to CRP coordinates via evaluation of the above equations, it is assumed that the data has been collected as set forth at step 201, supra, by common midpoint (CMP) methods. That is to say, it is taken as fact that the data at step 201 has been sequentially generated by a conventional seismic source located at a series of sourcepoint locations (SP), and then redundantly collected as converted traces at a series of detectors positioned at known detector locations (D) along the line of survey.

Since the converted traces are each associated with a source-detector pair of known sourcepoint-detector station coordinate locations (SP,D), subsequent processing in accordance with step 200 produces their easy transformation in terms of true common reflection point coordinates.

That is, step 200 establishes CRP coordinates for a gather of converted traces so as to time-correct each of the converted trace for (i) any elevational differences that may have existed between its sourcepoint-detector station coordinates at the time that the trace was derived (static corrections), as well as (ii) moveout differences associated with the travel paths of the energy (dynamic corrections). Result: the final traces represent an imaginary collection sequence as if a source associated with a given trace was placed at each CRP and activated followed immediately by the relocation of a detector at the CRP and the reception of converted phases of the generated wave. In that way, the CRP's associated with each gather of converted traces (in terms of (SP,D) locations of each source-detector pair, and an evaluated "k" constant) account for nonsymmetrical travel paths of the incident and reflected rays, a well as the dip and depth of the target reflector. Thereafter, the converted waves are stacked via instruction 202 in terms of CPR coordinates and then gathers displayed in accordance with instruction 203 as a zero offset seismic section of converted traces.

Figure 13:
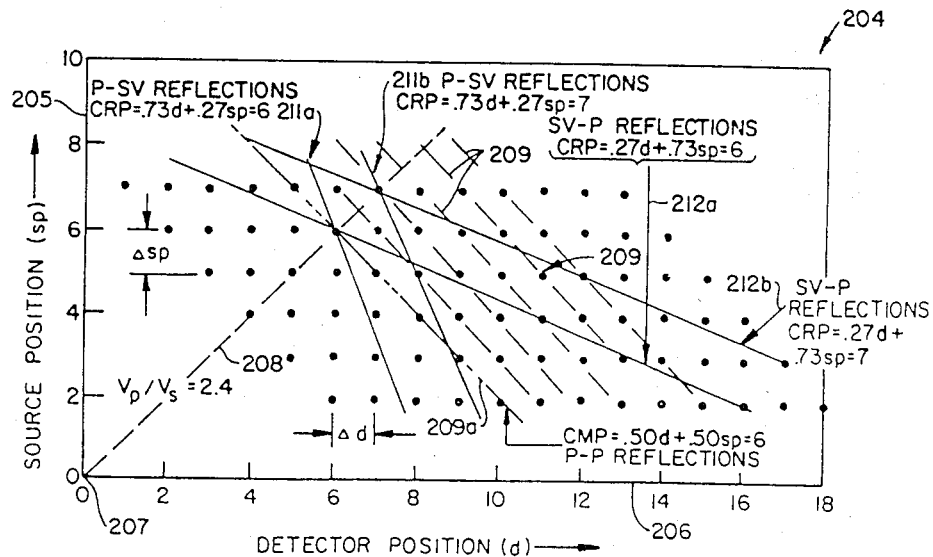
FIG. 13 is an enlarged detail of the stacking chart of FIG. 7 wherein common reflection point (CRP) lines along which converted traces can be gathered, are established by a selected equation of coordinate transformation.

FIG. 13 is of further interest, in explaining instruction 200 wherein a simplified stacking chart 204 is depicted and is discussed in connection with the collection system of FIG. 7.

As shown, each point on the diagram 204 has a source coordinate (SP) along axis 205 corresponding to the location of the source that gave rise to the trace corresponding to that point. The same point also has a (D)-coordinate along axis 206 corresponding to the location of the receiver whose output is also associated with traces in the same manner. In other words, the diagram 204 is a plot of the SP- and D-coordinates of all of the traces comprising a CMP seismic collection sequence. Location of the origin of the seismic line is at the instruction 207 of the axes 205, 206, viz., at D=SP=0. The example shown in FIG. 13 is a seismic line consisting of six 13-trace seismograms, which were recorded with an end-on layout geometry, wherein the incremental spacing of points as depicted on the diagram 204, viz., ΔSP and ΔD are made equal to each other.

For a given offset, as along axis 208, conventional common gather lines generally indicated at 209, intersect axis 208 at right angles. Consequently, coordinates (i.e. "addresses") of gatherable traces (aligned along such gather lines 209) are easily evaluated via the equation $$CMP = kD + (1-k)SP$$

where k is determined to be equal to 0.5.

That is to say, for conventional flat reflectors without mode conversion, the reflection points of the reflector are vertical projections of the midpoints between associated source-receiver pair locations producing the trace. Hence, a common reflection point on a target reflector is vertically associated with a pair of known (SP) and (D) coordinates. For example, for coordinates (SP) and (D) equal six (in conjunction with offset axis 208), the relevant traces for a proper gather would be aligned along dashed-dotted gather line 209a at right angles to the axis 208. Furthermore, within the gather of defined traces occurring along the line 209a, the source to receiver offset distance associated with any one trace of the gather, is also determinable because of the fact that the longest offset trace coordinates is a direct function of its sourcepoint (SP) and receiver station (D) coordinates. In the above example (involving gather line 209a), it would, of course, occur at coordinates (SP)=2 and (D)=10.

For converted waves incident on flat reflectors, gather lines are no longer along the 45-degree diagonals indicated at 209 of FIG. 13 but instead they are altered along sets of gather lines keyed to the evaluation of the constant "k" based on the type of elastic wave conversion that occurred and to a selected Vp/Vs ratio of the overburden above the target reflector, viz., either (i) along solid lines 211a, 211b, associated with P-wave to Sv-wave conversion, or (ii) along solid lines 212a, 212b, associated with Sv-wave to P-wave conversion.

Slopes of lines 211a, 211b and 212a, 212b for a selected Vp/Vs ratio, say Vp/Vs=2.4, are identified by "k" evaluations wherein the latter was found to equal to 0.73; and 1−k was found to be equal to 0.24. Thus, the coordinates for common reflection points on a flat target are found via evaluation of:

$$CRP = 0.73D + 0.27 \, SP$$

and $$CRP = 0.27D + 0.73\, SP$$

for P-to-Sv and Sv-to-P conversions, respectively, so as to provide the sets of lines 211a, 211b and 212a, 212a, 212b of FIG. 13.

Note that the sets of resulting gather lines 211a, 211b and 212a and 212b, while not being coincident with conventional midpoint gather lines, nevertheless can be stacked using a stacking algorithm defined by the above-mentioned equations augmented to search in SP v. D coordinates about each defined gather line, say, along a two-dimensional "fairway" path. In this regard, the following two-dimensional tolerance for limiting the search area so as to include only those transformed traces whose addresses place them within a selected "bin" of each defined fairway path, has been found to be adequate.

$$\text{Inclusion} = <\pm\tfrac{1}{2}\Delta D,\ \pm\tfrac{1}{2}\Delta SP$$

Hence, for a gather about a common reflection point having coordinates of (SP) and (D) equal to 6, (tolerance range: $\Delta D = \Delta SP = 5\tfrac{1}{2}$ to $6\tfrac{1}{2}$), traces associated with the line 211a meeting the above inclusion tolerance have source-receiver coordinates as set forth in Table I, below.

TABLE I

| | |
|---|---|
| SP = 7, | D = 6; |
| SP = 6, | D = 6; |
| SP = 5, | D = 6; |
| SP = 4, | D = 7; |
| SP = 3, | D = 7; |
| SP = 2, | D = 8. |

The above-described "binning" procedure is also useful in processing conventional data because of the fact that irregularities often occur in the field due to interference of roads, streams and cultural obstacles with desired shot and recording positions. The former prevent the exact sequence of shot and detector positions shown in FIG. 13, from occurring, viz., wherein common gather lines can be established along lines 209 of FIG. 13.

For dipping reflectors several additional variables associated with evaluation of the constant "k" are ascertained in the manner previously indicated, viz., the dip angle of the reflector, and the depth of that reflection point, via evaluation of the simultaneously collected conventional traces.

Figure 14:
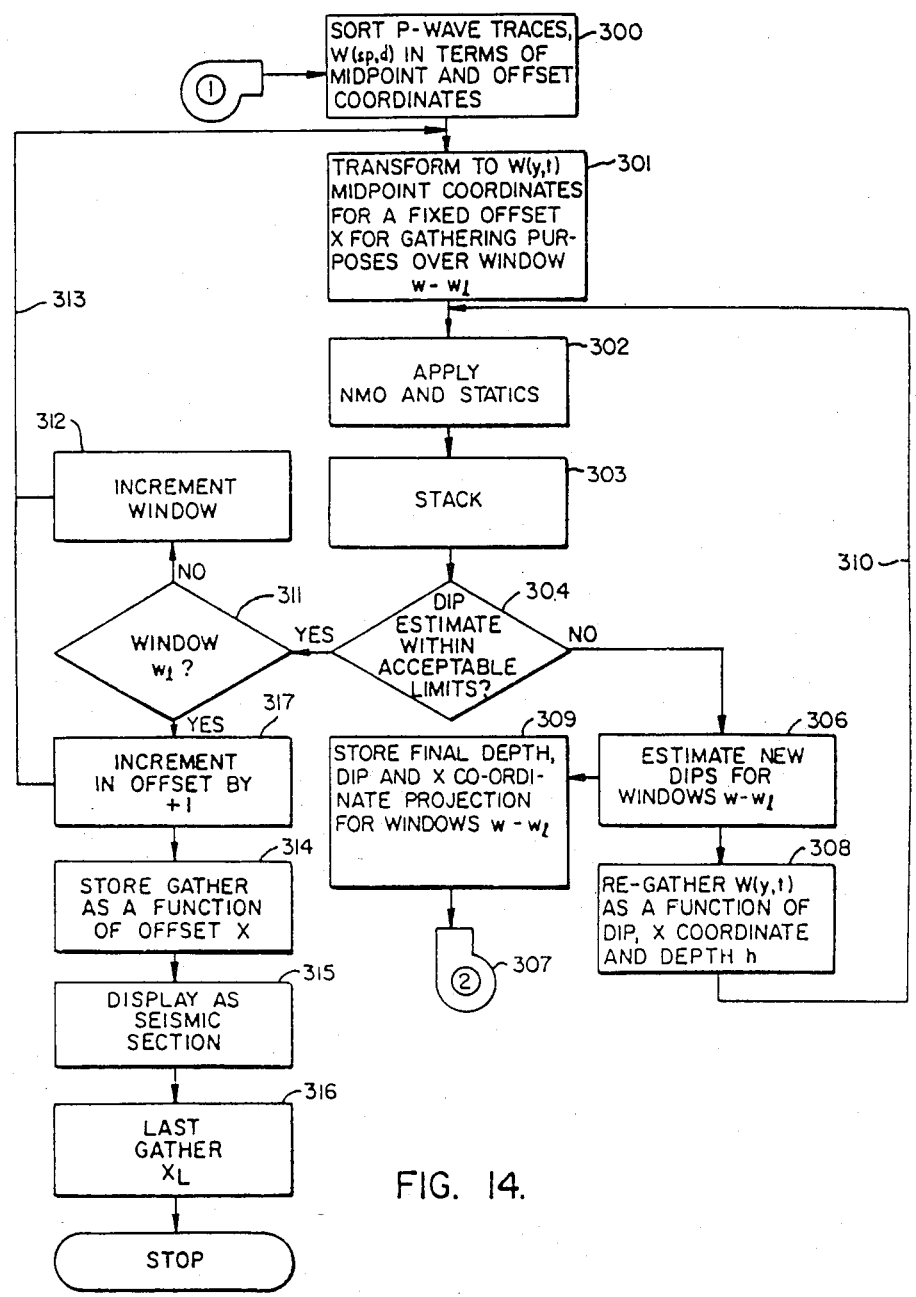
FIGS. 14 and 15 are flow diagrams of processing simultaneously collected conventional and converted traces for carrying out the method of the present invention.
Figure 15:
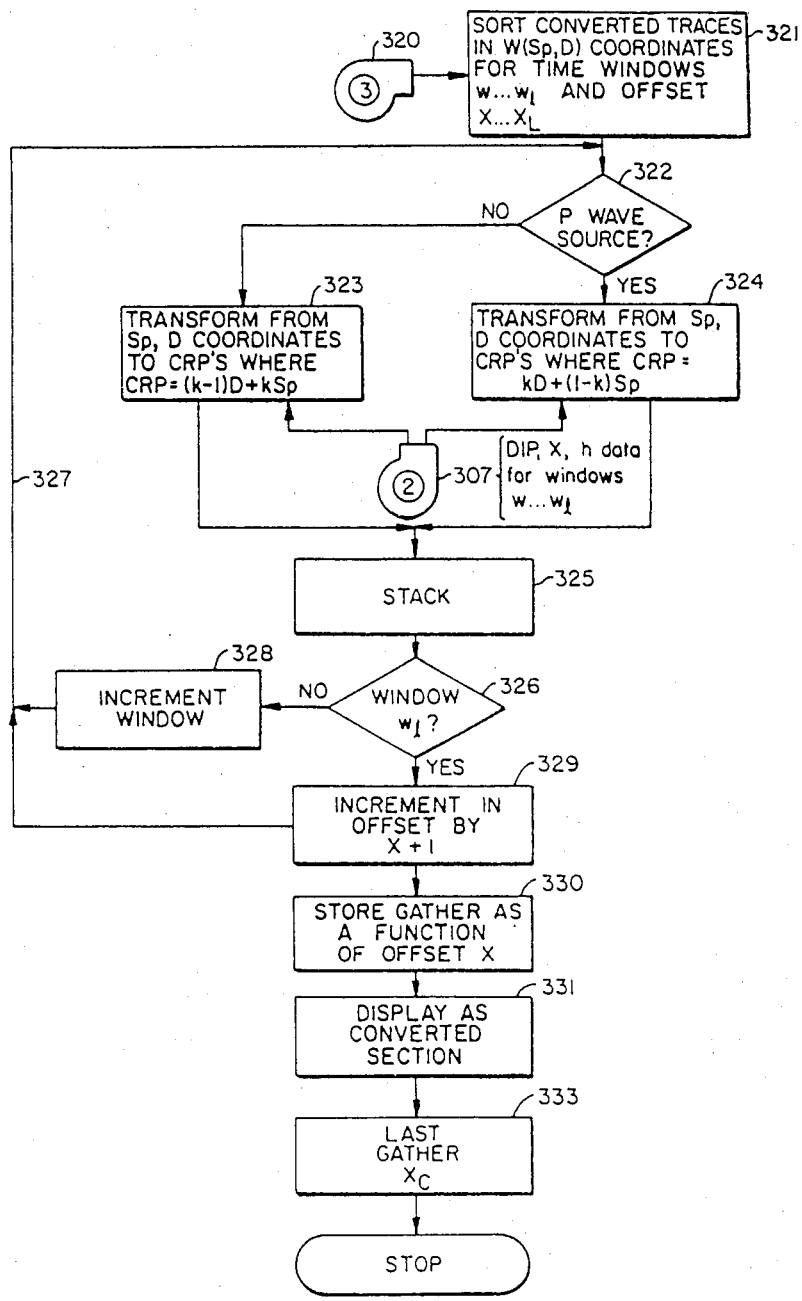

FIGS. 14 and 15 illustrate how the present invention can directly associate the conventional CMP seismic data to account for dipping reflectors.

Return now to the description of the transformation of coordinates equations with respect to a dipping reflector. It should be apparent from FIGS. 14 and 15 that events in the conventional traces recorded as a function of source (SP) and receiver (D) coordinates, are first evaluated. Then the determined dip and depth of target reflectors are used in the processing of the converted traces of interest. Dip evaluation is machine-oriented. Its determination, based on maximizing signal response as dip angle for each event of interest, is varied.

With reference to FIG. 13, the gathering and stacking of the conventional traces from flat reflectors would be along the diagonal lines 209. Hence, the true dip of any reflector in manner previously described with reference to the theoretical equations forming the foundation of the present invention, would only change the slope of these lines at the particular event of interest. It should be specifically noted that since the normal projections of the reflection points are themselves coded and stored in accordance with processing commands, the depth and dip of such events can likewise be easily included in stored codes for latter use in processing converted traces.

Now, in more detail, in FIG. 14, the field traces are first read in. Instruction 300 then assumes command and sorts the conventional traces as a function of source-receiver pair coordinates from which respective traces were derived. That is to say, the traces are sorted to form the trace function W(SP,D), but midpoint and offset address coordinates of such traces are also made of record.

Next, instruction 301 transforms the previously sorted traces into terms of reflection points that are vertical projections of the midpoints of particular source-receiver pairs associated with the traces of interest over a series of particular time window w . . . w1. That is to say, each trace is transformed initially as a function of a midpoint coordinate value to form the trace function W(y,t) for a fixed offset coordinate (X). The series of trace windows identified with same fixed offset (X) are then moved out and statically corrected via instruction 302 after which the traces are initially stacked as a function of the common midpoints (CMP's) of respective source-receiver pairs via instruction 303.

After decisional step 304 is negatively answered as a function of individual sample points along the trace window, new dip estimates are provided via instruction 306. Using a velocity function, its depth is also estimated. Next, at instruction 308, the coordinates of the reflections of the trace are re-estimated as a function of (i) dip of the target reflector; (ii) the SP and D coordinates of the perpendicular projection of the reflection point to a preselected horizon; and (iii) the depth h of the reflection point. Simultaneously, note the operations of instruction 309. That instruction is activated to store the aforementioned SP and D coordinates of the projection and the dip angle α and depth h of the target reflector, as the search for maximum signal response continues.

Iteration in loop 310 occurs until the decisional step 304 is affirmatively answered, i.e., the signal response has been maximized. During such iteration, instruction 309 merely buffers the interim dip, depth and surface coordinate data until step 304 releases loop 310 from active operations. At that time, the last-in buffered data is simultaneously released to tape recorder 307 to aid in latter processing of the converted traces as the described below. As the latter data is recorded at 307, the buffer is erased.

Instruction 311 next assumes control. Instruction 311 determines if the time window w . . . w1 is the last window for trace evaluation. If instruction 311 is answered negatively, instruction 312 increments the time window by one, and the loop 313 is entered to repeat the process. If instruction 311 is answered affirmatively, instruction 317 assumes control. Instruction 317 increments operations by advancing the process to the next gather coordinate. If the prior offset coordinate was (X), the next in time fixed offset coordinate would thus be offset coordinate X+1.

Loop 313 is again entered. Operations via instructions 301-312 as previously described, are sequentially activated to account for the dip, depth and projection data for the new gather of traces over windows w ... w1. In that way, the process can be made to repeat and then re-repeat itself so as to generate a series of gathers at different offset coordinates along with desired dip, depth and projection data.

At the same time that instruction 317 is incrementing the process to generate new gathers at a progressively increasing offset coordinates, instruction 314 and 315 are also placed in sequential operations to (i) store the gathers as a function of offset and (ii) then generate a stack of such gathers as a conventional seismic section. The process terminates when decisional step 316 is affirmatively answered.

The many advantages of the generated zero offset conventional section provided in accordance with FIG. 14, will be more apparent from a detailed discussion of FIGS. 15, 16, 17 and 18.

With reference to FIG. 15, note that the method of producing the converted zero offset section is similar to that shown in FIG. 14. There are a few variances, however. For example, after the converted traces on tape 320 have been inputted and sorted at instruction 321, the interpreter presets the source type used in the collection of the CMP data, either as a P-wave or as Sv-wave source to key—via instruction 322—the selection of the equation of coordinate transformation at operations 323 or 324. As previously indicated, such equations are selected from the group comprising:

$CMP = kD + (1 - k)SP$ (for P-wave to Sv-wave conversions);
$CMP = (1 - k)D + kSP$ (for Sv-wave to P-wave conversions).

In more detail, while operations 321 sorts the converted traces as a function source-receiver pair coordinates, viz., SP and D coordinates, note that offset addresses of such traces are also made of record. I.e., as the traces are sorted to form the trace function W(SP,D), offset coordinates for a series of particular time windows w ... w1 are also part and parcel, of each trace address.

Instructions 323, 324 transform the previously sorted traces in terms of common reflection points (CRP) coordinates that are surface projections associated with traces of particular source-receiver pairs, over the series of time windows w ... w1 and offset addresses coordinates X ... XL.

After the trace segments identified with the following (viz., the same fixed offset X, the identical time window w, and the same CRP coordinates), have been statically corrected, such trace segments are stacked at instruction 325. Such stacking, of course, takes into account reflector dip, reflector depth and reflector offset coordinate information, such data being supplied via tape 307 to the operations 323, 324 as shown in FIG. 15.

In regard to instruction 325, note that the transformed traces are summed along gather lines, that have been altered by "k" factor evaluation, augmented by a "bin" searching principle that searches in two dimensions along the selected "k" evaluated gather fairway path, as previously mentioned. In that way, transformed traces that have been determined by "k" factor evaluation and whose addresses placed such traces within the examined "bin", are summed. Such summing steps were previously discussed.

Decisional instruction 326 next assumes control to either continue processing the data via iteration loop 327 or to allow instruction 329 to assume command.

That is to say, process iteration via loop 327 continues until the decisional instruction 326 is affirmatively answered based upon whether or not the data associated with the last window w1 has been processed. That is, instruction 326 determines if the processed data is associated with the last window w1. If it is, instruction 329 assumes control; if it is not, i.e., if instruction 326 is answered negatively, instruction 328 increments the time window by one, and the loop 327 is entered to repeat the process. When instruction 329 does assume control, it increments operations by advancing the process to the next gather coordinate. If the prior offset coordinate was (X), the next in time fixed offset coordinate would thus be offset coordinate X+1. Loop 327 is again entered.

Operations via instructions 322–326 as previously described, thus are sequentially activated, to provide correctly transformed stacked converted data. That is, the process repeats and then re-repeat itself so as to generate a series of stacked gathers at different offset coordinates along with desired dip, depth and CRP projection coordinates.

At the same time that instruction 329 is incrementing the process to generate new stacked gathers at a progressively increasing offset coordinates, instructions 330 and 331 are also placed in sequential operations to (i) store the stacked gathers as a function of offset and (ii) generate a section of such gathers as a converted seismic section. The process terminates when decisional step 333 is affirmatively answered.

EXAMPLE

A field trial was undertaken in the Sacramento Valley of California. Vibrator, receiver and recording parameters are as set forth below in Table II.

TABLE II

P-wave Source; Mertz Model 9 Vibrators
A. Sweep Pattern: 3 Vibs × 20 Sweeps over 230'
B. Vibrator Separation: 55'
C. Move-up: 6'
D. Sweep Frequencies: 6-56 Hz, Upsweep
E. Sweep Time: 16 sec + 8 sec Listen
Recording Configuration
A. Coverage: 2400%
B. Spread: V.P. − 960' − 6600'
C. Group Interval: 120'
E. Geophone Array: In-line Boxcar
Recording Instrumentation
A. Gain: Binary
B. Sample Interval: 4 msec
C. Record Length: 24 sec
D. Preamp Gain: 2**7
E. Filters:
   1. Low Cut: Out
   2. High Cut: 83.5 Hz
   3. Notch: In, 60 Hz
F. Number of Channels: 4 × (48 Data + 4 Aux)
S-Wave Source: Mertz Model 13/609 Vibrators
A. Sweep Pattern: 3 Vibs × 20 Sweeps over 230'
B. Vibrator Separation: 55'
C. Move-up: 6'
D. Sweep Frequencies: 6-28 Hz, Upsweep
E. Sweep Time: 16 sec + 8 sec Listen FIG. 16 is a conventional zero offset section.

Note initially that production is gaseous hydrocarbons from a Winters sandstone generally indicated within boxed area 403. Interpretations further indicate the sandstone is overlain by deltaic shales which form an impenetratable closure. Bright spots 404, 405 (within boxed area 403) indicates the location of the trapped gas. Additional events of interest are identified at 400, 401 and 402. Event 400 is formed within a tertiary sedimentary complex. Event 401 is at the base of that complex. Event 402 is from a low velocity shale just above the Winters sandstone of interest.

Figure 17:
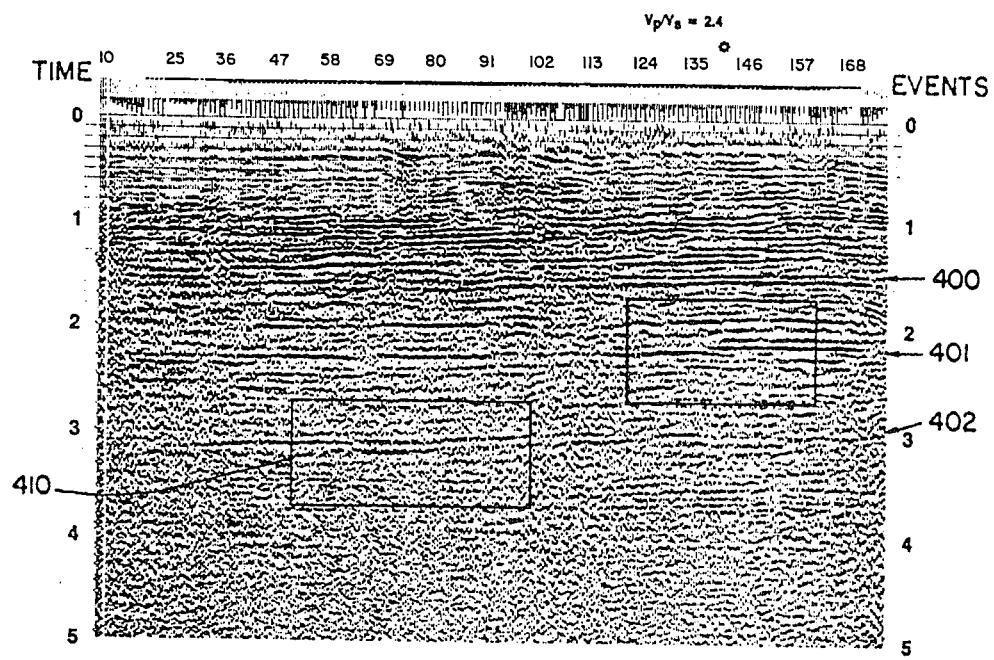
Figure 18:
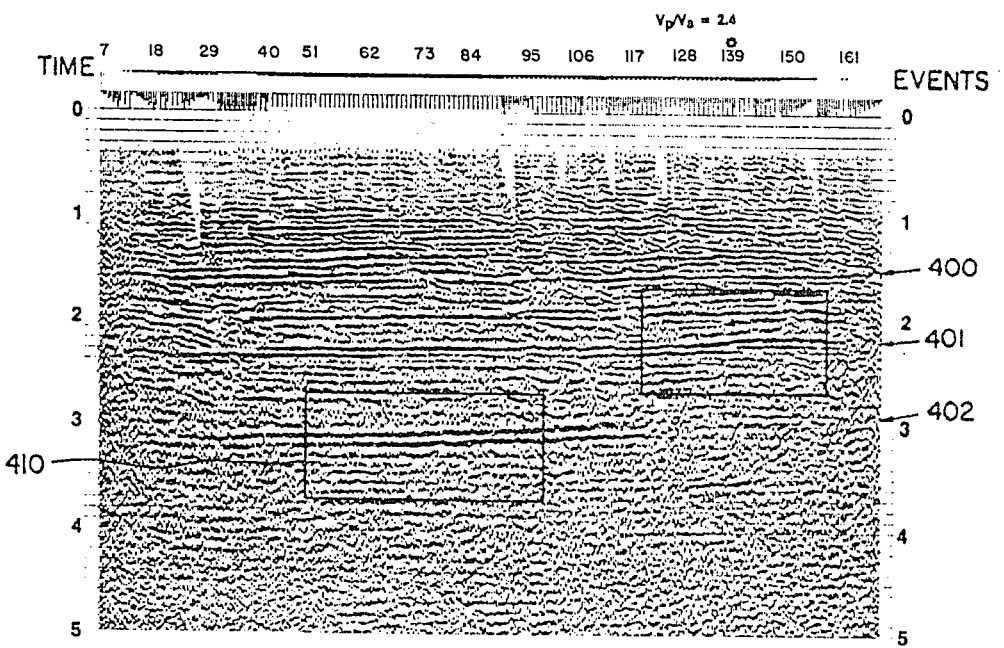

FIGS. 17 and 18 are zero offset stacked sections of the converted data; in FIG. 17, a P-wave source was used; in FIG. 18, an Sv-wave source was employed. The resulting P-Sv and Sv-P wave converted sections, respectively, were processed in accordance with the method of the present invention depicted in FIG. 15.

Figure 16:
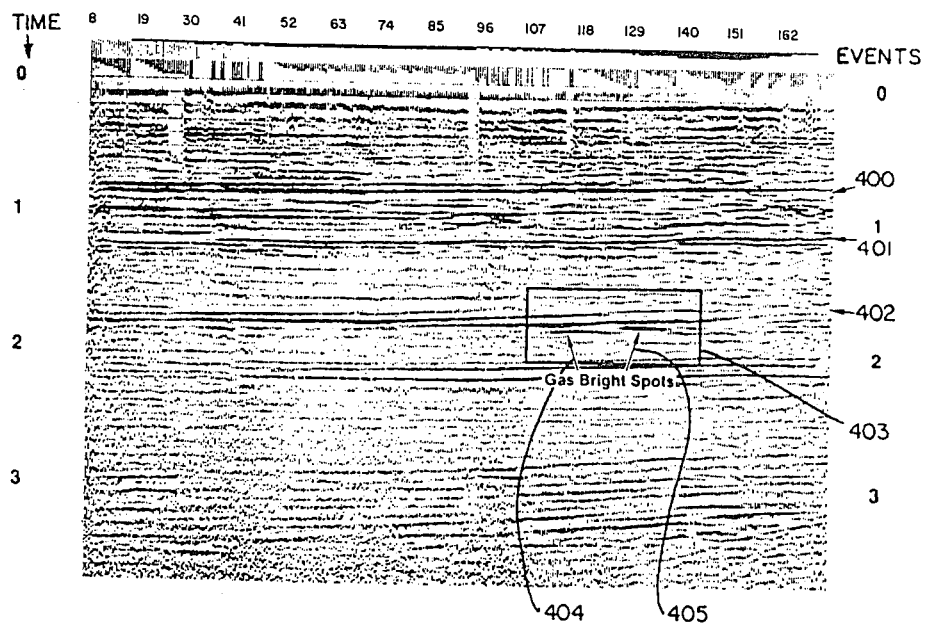

In brief, note from these Figures that the low velocity shale just above the Winters sandstone, viz., event 402 of FIG. 16, has been dramatically extended in the lateral direction of the sections, say, in the region outlined by solid line 410. More remarkable, events 400, 401 and 402 in FIG. 18, show outstanding resolution even through the amplitude level of Sv-P wave conversion is theoretically much lower than that of the P-Sv wave conversion shown in FIG. 17.

FIGS. 19a–19i and 20a–20i illustrate in still greater detail events of interest in FIGS. 16, 17 and 18, viz., normalized to common horizontal coordinates along the line of survey, details of the zero offset sections associated with events 401, 402.

Now, in more detail, in FIGS. 19a–19i, improved resolution in event 401 at the base of tertiary sedimentary complex is specifically indicated. That is to say, in FIGS. 19a and 19d obtained by conventional common midpoint stacking procedures, the fault 420 is shown to have been shifted to the left in FIG. 19a and to the right in FIG. 19d. In contradistinction, in FIGS. 19b, 19c, and 19e, 19f, the fault 420 have been correctly shifted for proper alignment, that is to say, (i) for P-Sv conversion, the fault 420 is seen to be shifted from left to right as viewed in FIGS. 19b and 19c, and (ii) for Sv-P-wave conversion, the same fault in FIG. 19d, is shifted from right to left as viewed in FIGS. 19e and 19f.

The better indicate lateral alignment of the fault 420, compare the position of that fault in FIGS. 19g–19i. E.g., FIG. 19g shows up-scaled details of the P-wave common midpoint stacked data, with the fault 420 depicted as shown. FIG. 19h shows the P-Sv-wave converted section, while FIG. 19i depicts the Sv-P-wave converted section. FIGS. 19h and 19i are both provided in accordance with the teaching previously set forth in this specification. Note the lateral resolution of the fault 420 has been shapened and is consistent from FIG.-to-FIG.

FIGS. 20a–20i and similar to FIGS. 19a–19i except that event 402 is of prime interest (recall that such event 402 relates to a low velocity shale above Winters sandstone of interest).

In FIGS. 20a–20i note the improved resolution of the event 402. That is to say, in FIGS. 20a and 20d obtained by conventional common midpoint stacking procedures, the event 402 is shown to have been shifted to the left in FIG. 20a, to the right in FIG. 20d. In contradistinction, in FIGS. 20b, 20c, 20e and 20f that event has been correctly shifted for proper alignment, that is to say, the event 402 is seen to have been shifted from left to right as viewed in FIGS. 20b and 20c and from right to left in FIGS. 20e and 20f.

Figure 20A:
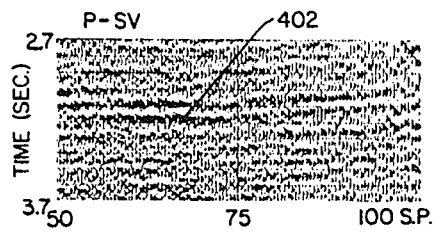
Figure 20D:
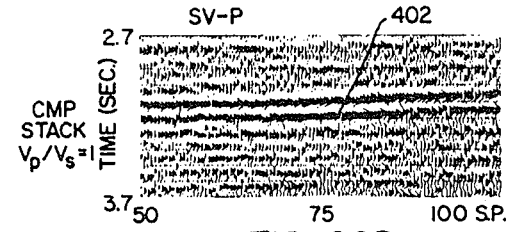
Figure 20B:
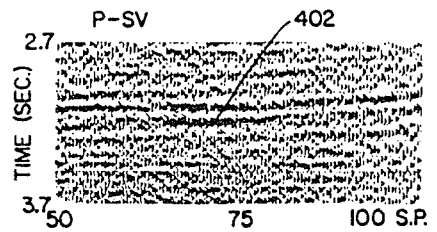
Figure 20E:
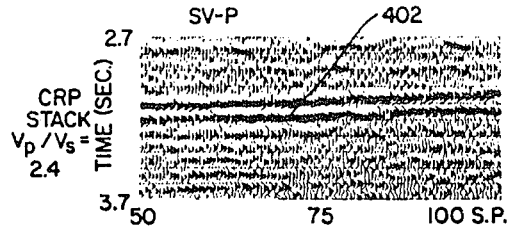
Figure 20C:
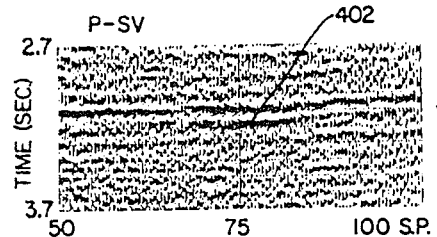
Figure 20F:
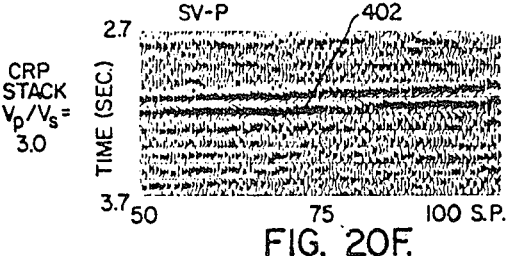
Figure 20G:
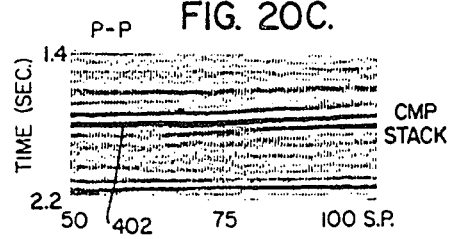
Figure 20H:
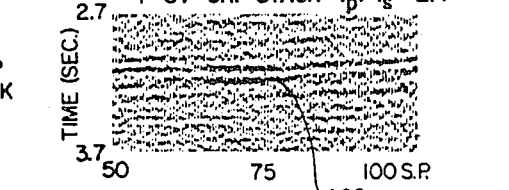
Figure 20I:
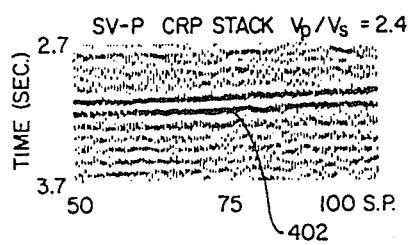

Further depiction of the lateral resolution improvement of event 402 is depicted by FIGS. 20g, 20h and 20i.

For example, FIG. 20g shows up-scaled details of the P-wave common midpoint stacked data. FIG. 20h shows the P-Sv-wave section while FIG. 20i shows the Sv-P-wave section both constructed in accordance with the present invention. Note that the lateral resolution of the event 402 is consistent in a laterally sense in FIGS. 20h and 20i.

It can also be seen that while FIGS. 20g–20i are about equally sensitive to lateral shear wave impedance variations, the offset sensitivity varies with reflection mode. In FIG. 20g for example, conventional reflected P-waves being primarily sensitive to P-wave impedance, there is less amplitude variation across event 402 than in FIGS. 20h and 20i.

Note also in FIGS. 20d, 20e and 20f that event 402 moves from right to left as viewed as the Vp/Vs ratio of the overburden increases from Vp/Vs=1 (FIG. 20d) to a value of Vp/Vs=3 (FIG. 20f). As previously indicated, the magnitude of the shift of the reflection point (from left to right in FIGS. 19b, 19c, 20b and 20c and from right to left in FIGS. 19e, 19f, 20e and 20f) is a function of the Vp/Vs ratio of the overburden.

Hence, correct determination of the P- and Sv-wave velocities is required in order to provide accurate, true zero offset sections.

Even with such data, evaluations of the stacking horizontal velocity required when using the equations of coordinate transformation of the present invention, requires a good initial guess of that value. In this regard, employment of the geometric mean of known P- and Sv-wave velocities, has been found to be very helpful, viz., $V_{ps} = \sqrt{V_p V_s}$.

Figure 21:
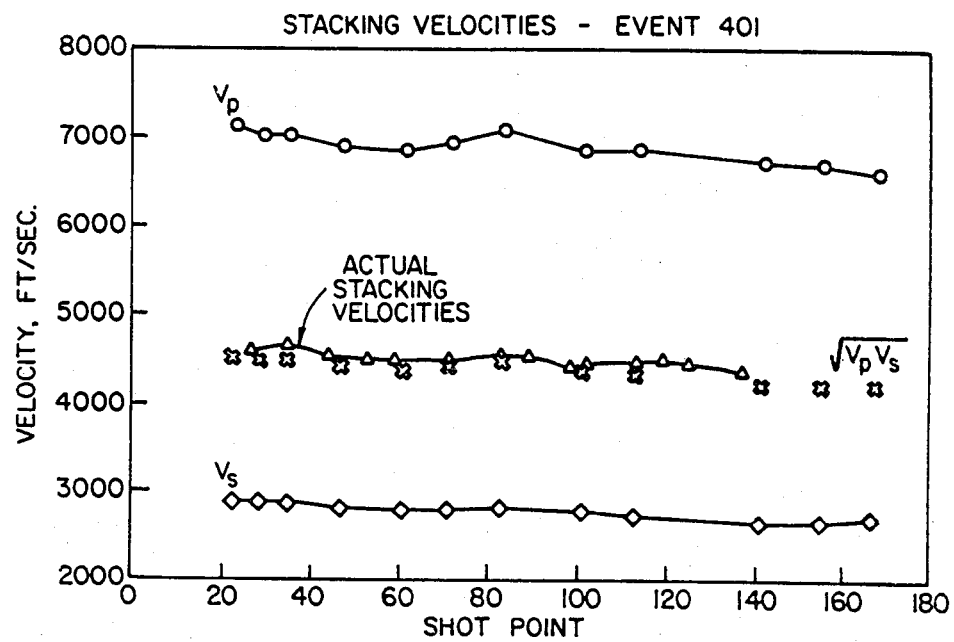
FIGS. 21 and 22 are plots of stacking Vp, Vs velocities, as well as their geometric means as a function of shot point location, of separate events in the seismic sections of FIGS. 16-20$i$.
Figure 22:
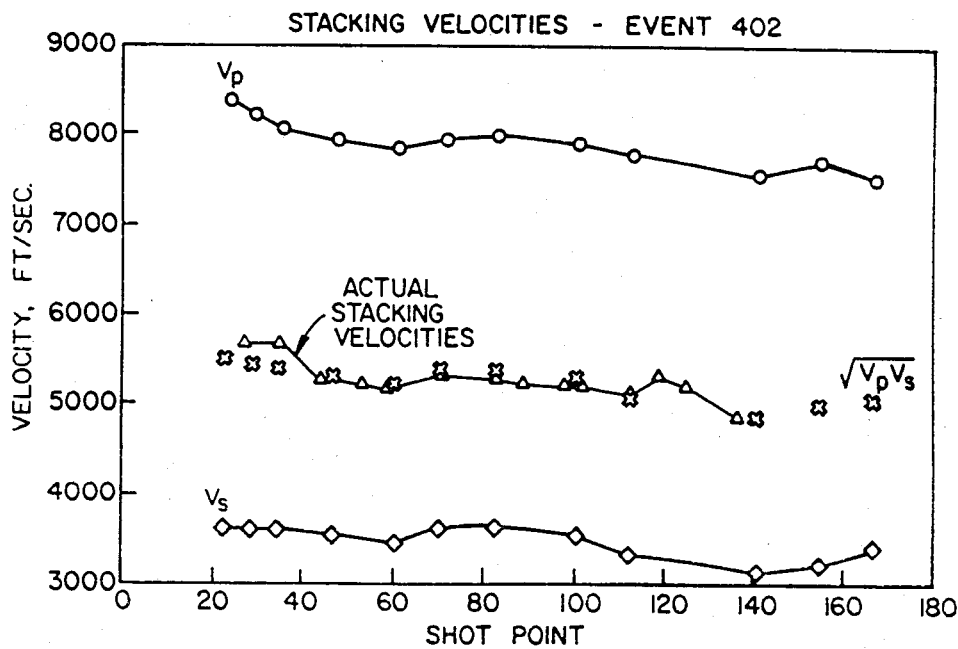

Agreement between the geometric mean of P- and S-wave velocities and the final stacking velocities for events 401, 402 of FIGS. 16–18, is good. In FIG. 21, for event 401, only a small discrepancy of a few hundred feet per second appears. Similarly, in FIG. 22, for event 402, similar good results are evident. Note also that discrepancies appear to decrease going from FIG. 21 to FIG. 22. This is predictable since the offset to depth ratio of the reflectors of interest, viz., event 401 vis-a-vis event 402, decrease as a function of offset.

The invention is not limited to the above combinations alone, but is applicable to other anomalous circumstances as known to those skilled in the art. It should thus be understood that the invention is not limited to any specific embodiments set forth herein, as variations are readily apparent. Thus, the invention is to be given the broadest possible interpretation within the terms of the following claims.

What is claimed is:

1. In a method of improving resolution of seismic data collected by conventional common midpoint collection (CMP) methods including sequentially activating a conventional seismic source at a series of sourcepoint locations (SP) along a line of survey and redundantly collecting reflections of both the conventional waves and the converted phases thereof via a series of multicomponent detectors at a plurality of detector stations (D) along said line of survey each detector simultaneously but separately recording the motion of the earth in the radial horizontal direction and in the vertical direction, wherein each resulting convention and converted trace is associated with a sourcepoint-detector station pair of known (SP,D) coordinates, the improvement thereof related to processing both conventional and converted traces in a systematic manner whereby resulting conventional and converted gathers of such traces each samples a reflection point of a target reflector in the subsurface common to each gather irrespective of dip and depth of said target reflector, comprising the steps of
- (i) generating seismic field records including at least separate conventional and converted seismic records, by positioning and employing an array of source and multi-component detectors such that individual sourcepoint-detector station coordinates can be redundantly associated with a selected number of conventional and converted traces of said records said converted and conventional traces being the simultaneous output of said detectors,
- (ii) establishing for said conventional and converted traces a series of separate common reflection points (CRP's) each CRP being for gathering traces common thereto as if a source associated with a given trace of a common gather was placed at said each CRP and activated followed immediately by the relocation of a detector at said each CRP and the reception of conventional or converted waves comprising said conventional or converted trace;
- (iii) each CRP associated with said common gather of conventional traces being made to account for different travel paths of the wave, due to depth and dip of each target reflector;
- (iv) each CRP associated with said common gather of converted traces undergoing dynamic sourcepoint-detector station coordinate transformation to account for nonsymmetrical travel paths of incident and reflected ray, dip as well as depth of said target reflectors, wherein the equation of coordinate transformation is selected from the group comprising:

$CRP = kD + (1 - k)SP$:  for conversions of P-waves to Sv-waves at the target;
$CRP = (1 - k)D + kSP$:  for conversions of Sv-waves to P-waves at the target;

where $$k = \frac{(V_p/V_s)}{[(V_p/V_s) + \{1 + (X/h)\sin\alpha\}(1+f)^{-\frac{1}{2}}]};$$

$$f = \frac{[(V_p/V_s) - 1]}{[(V_p/V_s) + 1]}(X/h)^2 \cos^2\alpha;$$

Vp and Vs are the P-wave and Sv-wave velocities, respectively, of the overburden;
X is the source-receiver offset distance;
h is the depth of the target reflector;
α is the dip angle of the target reflector; and
SP and D are source and detector coordinates, respectively, along the line of survey,
- (v) separately gathering traces of said conventional and said converted traces associated with each CRP along established gather paths,
- (vi) separately stacking said gathered conventional and converted traces of step (v) to form sets of true zero offset conventional and converted seismic sections having insignificant horizontal smearing of events therealong and
- (vii) displaying said true zero sections of step (vi) side-by-side, as a function of similar horizontal coordinates along said line of survey, whereby significant improvement in event resolution therebetween, is provided.

2. Improvement of claim 1 in which said dip and depth values employed by said selected equation of coordinate transformation are provided as a by-product of transformation and enhancement processing of said conventional traces.

3. Improvement of claim 2 in which said transformation and enhancement processing involve the substep of:
establishing common midpoint coordinates for said conventional traces as a function of each traces source-point-detector station (SP,D) coordinates, gathering said traces along established common midpoint gather lines, stacking said gathered traces to form finite offset sections, then estimating depth and dip from said sections for events therealong, and then regathering said conventional traces along altered gather lines to establish said true CRP's therefor, and restacking said regathered traces until a true zero offset section is formed, said final estimates of depth and dip of said events being subsequently employed in said selected equation of coordinate transformation of step (iv).

4. Improvement of claim 3 in which said substep of regathering and restacking said conventional traces until a true zero offset section is formed, is an iteration operation that terminates when the signal response for each of said events, is maximum.

5. Improvement of claim 1 in which said step (ii) includes the step of statically correcting said conventional and converted traces to normalize said sourcepoint and detector station coordinates to a common horizontal elevational plane coextensive with said line of survey.

6. Improvement of claim 1 in which said target reflector is substantially parallel to said horizontal datum plane wherein an equation of coordinate transformation for said conventional traces is in accordance with $$CRP_{convent.} = 0.5SP + 0.5D$$

where
Vp/Vs of the overburden is unity, and
SP, D are sourcepoints and detector station coordinates, respectively.

7. Improvement of claim 6 wherein said k constant of said selected equation of coordinate transformation for said converted traces is in accordance with:

$$k = \frac{(V_p/V_s)}{(V_p/V_s) + 1}$$

where
Vp/Vs of the overburden is determined by experimental or empirical data.

8. Improvement of claim 2 in which said dip and depth values of said target reflector interrelate such that said k constant of said selected equation of dynamic transformation for converted traces can be approximated in accordance with:

$$k = \frac{(V_p/V_s)}{[(V_p/V_s) + (1 + (X/h\sin\alpha)]}$$

9. A method of improving resolution of seismic data collected by conventional common midpoint collection (CMP) methods including sequentially activating a conventional seismic source at a series of sourcepoint locations (SP) along a line of survey and redundantly collecting reflections of both the conventional waves and the converted phases thereof via a series of multicomponent detectors at a plurality of detector stations (D) along said line of survey each detector simultaneously but separately recording the motion of the earth in the radial horizontal direction and in the vertical direction, whereby resulting conventional and converted gathers of such traces each systematically samples a reflection point of a target reflector in the subsurface common to each gather irrespective of dip and depth of said target reflector, comprising the steps of
  (i) generating seismic field records including at least separate conventional and converted seismic records, by positioning and employing an array of source and multi-component detectors such that individual sourcepoint-detector station (SP,D) coordinates can be redundantly associated with a selected number conventional and converted traces of said records, said converted and conventional traces being the simultaneous output of said detectors,
  (ii) separately establishing for said conventional and converted traces a series of common reflection point (CRP) coordinates each associated with a gather of traces as if a source associated with a given trace was placed at said each CRP and activated followed immediately by the relocation of a detector at said each CRP and the reception of conventional or converted waves comprising said conventional or converted trace,
  (iii) each CRP associated with conventional traces being made to account for different travel paths of the wave, due to depth and dip of each target reflector;
  (iv) each CRP associated with converted traces undergoing at least dynamic sourcepoint-detector station coordinate transformation to account for nonsymmetrical travel paths of incident and reflected ray, dip as well as depth of said target reflectors, using an equation of coordinate transformation selected from the group comprising:

$CRP = kD + (1 - k)SP$: for conversions of $P$-waves to $Sv$-waves at the target;
$CRP = (1 - k)D + kSP$: for conversions of $Sv$-waves to $P$-waves at the target;

where $$k = \frac{(V_p/V_s)}{[(V_p/V_s) + \{1 + (X/h)\sin\alpha\}(1 + f)^{-\frac{1}{2}}]};$$

$$f = \frac{[(V_p/V_s) - 1]}{[(V_p/V_s) + 1]}(X/h)^2 \cos^2\alpha;$$

Vp and Vs are the P-wave and Sv-wave velocities, respectively, of the overburden;
X is the source-receiver offset distance;
h is the depth of the target reflector;
α is the dip angle of the target reflector; and
SP and D are source and detector coordinates, respectively, along the line of survey,
  (v) separately gathering traces of said conventional and said converted traces associated with each CRP along established gather paths,
  (vi) separately stacking said gathered conventional and converted traces of step (v) to form sets of true zero offset conventional and converted seismic sections having insignificant horizontal smearing of events therealong and
  (vii) displaying said true zero sections of step (vi) side-by-side, as a function of similar horizontal coordinates along said line of survey, whereby significant improvement in event resolution therebetween, is provided.

10. Method of claim 9 in which said dip and depth values employed by said selected equation of coordinate transformation are provided as a by-product of transformation and enhancement processing of said conventional traces.

11. Method of claim 10 in which said transformation and enhancement processing of said conventional traces involve the substeps of:
  establishing common midpoint coordinates for said conventional traces as a function of each traces source-point-detector station (SP,D) coordinates, gathering said traces along established common midpoint gather lines, stacking said gathered traces to form a finite offset sections, then estimating depth and dip from said sections for events therealong, and then after re-estimating true CRP's from said dip and depth data, regathering said conventional traces along altered gather lines and restacking said regathered traces until a true zero offset section is formed, said final estimates of depth and dip of said events being subsequently employed in said equation of coordinate transformation of step (iv).

12. Method of claim 9 in which said step (ii) includes the step of statically correcting said conventional and converted traces to normalize said sourcepoint and detector station coordinates to a common horizontal elevational plane coextensive with said line of survey.

13. Method of claim 12 in which said target reflector is substantially parallel to said horizontal datum plane wherein an equation of transformation for said conventional and traces is in accordance with $$CRP_{convent.} = 0.5SP + 0.5D$$

where
Vp/Vs of the overburden is unity, and
SP, D are sourcepoints and detector station coordinates, respectively.

14. Method of claim 13 wherein said k constant of said selected equation of transformation for said converted traces, is in accordance with:

$$k = \frac{(V_p/V_s)}{(V_p/V_s) + 1}$$

15. Method of claim 9 in which said dip and depth values of said target reflector interrelate such that said equation of k constant of said selected transformation for converted traces can be approximated in accordance with:

$$k = \frac{(V_p/V_s)}{[(V_p/V_s) + (1 + (X/h)\sin\alpha)]}$$

* * * * *